(12) United States Patent
Iida et al.

(10) Patent No.: US 7,412,820 B2
(45) Date of Patent: Aug. 19, 2008

(54) AIR-FUEL RATIO CONTROL SYSTEM FOR INTERNAL COMBUSTION ENGINE

(75) Inventors: Jun Iida, Wako (JP); Hidetaka Maki, Wako (JP); Yukio Suehiro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/717,712

(22) Filed: Mar. 14, 2007

(65) Prior Publication Data
US 2007/0227123 A1    Oct. 4, 2007

(30) Foreign Application Priority Data
Apr. 3, 2006    (JP)    ............... 2006-101504

(51) Int. Cl.
*F01N 3/00*    (2006.01)
*F02D 41/14*    (2006.01)
(52) U.S. Cl. .................. 60/274; 60/276; 60/277; 60/285; 73/118.1; 123/688; 701/109
(58) Field of Classification Search .......... 123/688, 123/690, 694; 60/274, 276, 277, 285; 73/118.1; 701/109
See application file for complete search history.

(56) References Cited
U.S. PATENT DOCUMENTS
5,337,558 A    8/1994    Komatsu 5,400,592 A *  3/1995   Mukaihira et al. ............ 60/274
5,568,725 A    10/1996  Uchikawa
6,032,659 A    3/2000   Yamashita et al.
7,254,474 B2 * 8/2007   Iihoshi et al. ................ 701/109

FOREIGN PATENT DOCUMENTS
EP    1 703 108 A1    9/2006
JP    4-036651 A      2/1992
JP    10-73049 A      3/1998

* cited by examiner

*Primary Examiner*—T. M Argenbright
(74) *Attorney, Agent, or Firm*—Arent Fox LLP

(57) ABSTRACT

An air-fuel ratio control system for an internal combustion engine having a catalyst provided in an exhaust system of the engine for purifying exhaust gases and a first oxygen concentration sensor disposed upstream of the catalyst is disclosed. The air-fuel ratio control system controls an air-fuel ratio of an air-fuel mixture supplied to the engine. A degree of response deterioration of the first oxygen concentration sensor is detected. A response delay of the first oxygen concentration sensor is compensated according to the detected degree of deterioration to calculate a compensated sensor output. The air-fuel ratio is controlled so that a detected air-fuel ratio calculated from the compensated sensor output coincides with a target air-fuel ratio. A frequency characteristic of the compensation is adjusted according to the detected degree of deterioration.

9 Claims, 18 Drawing Sheets

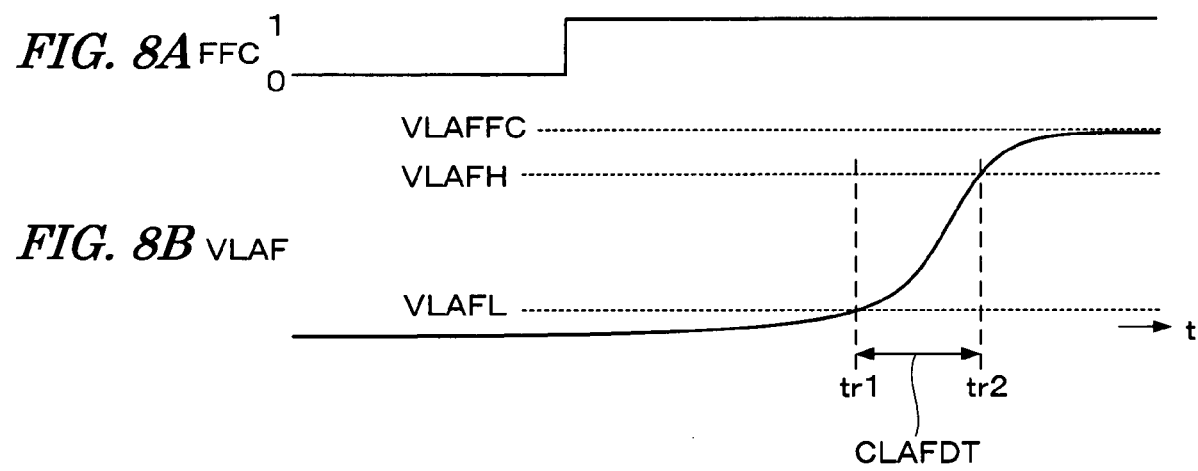
FIG. 8A
FIG. 8B
FIG. 9

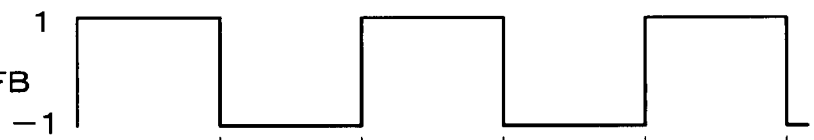
FIG. 14A KOSFB
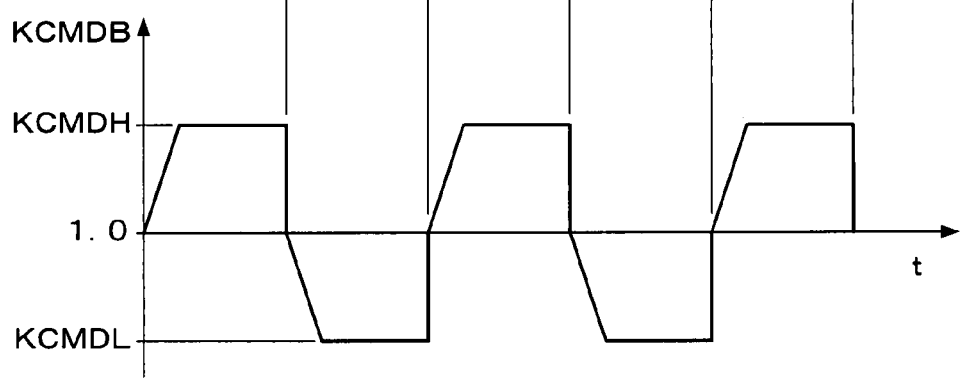
FIG. 14B

AIR-FUEL RATIO CONTROL SYSTEM FOR INTERNAL COMBUSTION ENGINE

BACKGROUND OF THE INVENTION

1. Field of the Invention

The present invention relates to an air-fuel ratio control system for an internal combustion engine and, particularly, to a control system having a function of determining deterioration of an oxygen concentration sensor provided in the exhaust system of the engine.

2. Description of the Related Art

Japanese Patent Laid-open No. H04-36651 (JP-'651) discloses a method of adjusting a control gain of an air-fuel ratio feedback control according to an output of an oxygen concentration sensor when the oxygen concentration sensor is determined to have deteriorated. In this method, the deterioration of the oxygen concentration sensor is determined based on the output of the oxygen concentration sensor at the beginning of an interrupting operation of the fuel supply of the internal combustion engine, or at the restart of the fuel supply.

Specifically, the control gain of the air-fuel ratio feedback control is adjusted so that the control gain decreases as the degree of deterioration of the oxygen concentration sensor increases.

In air-fuel ratio feedback control, if the oxygen concentration sensor is not deteriorated when the target air-fuel ratio is made to change as shown by the thin solid line L1 of FIG. 21A, the sensor detected air-fuel ratio AFS, which is calculated based on the sensor output, changes as shown by the thick solid line L2 of FIG. 21A. An air-fuel ratio control signal SCTL, which is generated by the PID control based on the sensor detected air-fuel ratio AFS, changes as shown by the dashed line L3 of FIG. 21A.

If the oxygen concentration sensor becomes deteriorated, the sensor detected air-fuel ratio AFS changes as shown by the solid line L2 of FIG. 21B, and the air-fuel ratio control signal SCTL greatly overshoots as shown by the dashed line L3 of FIG. 21B. In this state, if the control gain is adjusted as described above, the sensor detected air-fuel ratio AFS and the air-fuel ratio control signal SCTL respectively change as shown by the solid line L2 and the dashed line L3 of FIG. 21C. That is, the overshoot of the air-fuel ratio control signal SCTL is eliminated but, as shown by the dashed line L3 of FIG. 21A, the air-fuel ratio control signal SCTL, which corresponds to the characteristic obtained when the oxygen concentration sensor is normal, is not obtained. In the example shown by FIGS. 21B and 21C, the oxygen concentration sensor has deteriorated beyond a certain amount. Therefore, it is considered that the sensor detected air-fuel ratio AFS does not indicate the actual air-fuel ratio and that the air-fuel ratio control signal SCTL indicates an air-fuel ratio changing characteristic which is similar to changes in the actual air-fuel ratio (refer to FIG. 21A).

SUMMARY OF THE INVENTION

The present invention was made contemplating the above-described point. An aspect of the present invention is to provide an air-fuel-ratio control system for an internal combustion engine that maintains good control performance of the air-fuel ratio by performing more appropriate compensation of the oxygen concentration sensor output when the response characteristic of the oxygen concentration sensor used for the air-fuel ratio feedback control has deteriorated.

To attain the above aspect, the present invention provides an air-fuel ratio control system for an internal combustion engine having a catalyst provided in an exhaust system of the engine for purifying exhaust gases. The air-fuel ratio control system controls an air-fuel ratio of an air-fuel mixture supplied to the engine and includes a first oxygen concentration sensor disposed upstream of the catalyst, compensating means, sensor deterioration detecting means, adjusting means, and control means. The compensating means compensates a response delay of the first oxygen concentration sensor to calculate a compensated sensor output (VLAFC). The sensor deterioration detecting means detects a response deterioration degree (T) of the first oxygen concentration sensor. The adjusting means adjusts a frequency characteristic of the compensating means according to the deterioration degree (T) detected by the sensor deterioration detecting means. The control means controls the air-fuel ratio of the air-fuel mixture so that a detected air-fuel ratio (KACT) calculated from the compensated sensor output (VLAFC) coincides with a target air-fuel ratio (KCMD).

With this configuration, the deterioration degree of the first oxygen concentration sensor disposed upstream of the catalyst is detected, and the frequency characteristic of the compensating means, which compensates the response delay of the first oxygen concentration sensor to calculate the compensated sensor output, is adjusted according to the detected deterioration degree. By this adjustment, the compensated sensor output substantially coincides with a sensor output obtained when the first oxygen concentration sensor is not deteriorated. Therefore, by controlling the air-fuel ratio of the air-fuel mixture so that the detected air-fuel ratio calculated from the compensated sensor output coincides with the target air-fuel ratio, the actual air-fuel ratio coincides with the target air-fuel ratio with sufficient accuracy. In this manner, good air-fuel ratio control performance is maintained even when the first oxygen concentration sensor has deteriorated in response characteristic.

Preferably, the air-fuel ratio control system further includes intake air flow rate detecting means, a second oxygen concentration sensor disposed downstream of the catalyst, inflowing oxygen amount calculating means, air-fuel ratio switching control means, and catalyst deterioration detecting means. The intake air flow rate detecting means detects an intake air flow rate (GAIR) of the engine. The inflowing oxygen amount calculating means calculates an inflowing oxygen amount (OS) which is an amount of oxygen flowing into the catalyst according to the oxygen concentration (O2N) calculated from the compensated sensor output (VLAFC) and the intake air flow rate (GAIR) detected by the intake air flow rate detecting means. The air-fuel ratio switching control means controls the air-fuel ratio of the air-fuel mixture supplied to the engine alternating between a lean air-fuel ratio which is leaner than the stoichiometric ratio and a rich air-fuel ratio which is richer than the stoichiometric ratio according to a comparison result obtained by comparing the inflowing oxygen amount (OS) with target values (OSOBJR, OSOBJL) of the inflowing oxygen amount. The catalyst deterioration detecting means detects a deterioration degree (RESULT) of the catalyst based on a second oxygen concentration sensor output (SVO2) during the operation of the air-fuel ratio switching control means.

With this configuration, the intake airflow rate of the engine is detected, and the inflowing oxygen amount which flows into the catalyst is calculated according to the detected intake air flow rate and the compensated sensor output. The air-fuel ratio switching control alternately controls the air-fuel ratio to a lean air-fuel ratio which is leaner than the stoichiometric ratio and a rich air-fuel ratio which is richer than the stoichiometric ratio according to the comparison result obtained by comparing the inflowing oxygen amount with the target values of the inflowing oxygen amount. Further, the deterioration degree of the catalyst is detected based on the output of the second oxygen concentration sensor during the air-fuel ratio switching control. By setting the target value of the inflowing oxygen amount so that the second oxygen concentration sensor output minimally changes when the catalyst is normal and greatly changes when the catalyst is deteriorated, quick detection of the deterioration degree is obtained without degrading the exhaust characteristics of the engine at all when the catalyst is normal and with minimal degradation of the exhaust characteristics when the catalyst begins to deteriorate. Further, even when the first oxygen concentration sensor has deteriorated in the response characteristic, the inflowing oxygen amount of the catalyst is appropriately controlled by using the compensated sensor output to prevent the exhaust characteristics from deteriorating.

Preferably, the air-fuel ratio control system further includes switching means for switching the first oxygen concentration sensor output (VLAF) and the compensated sensor output (VLAFC) according to the deterioration degree (T) detected by the sensor deterioration detecting means. The control means and the inflowing oxygen amount calculating means respectively calculate the detected air-fuel ratio (KACT) and the oxygen concentration (O2N) according to an output of the switching means.

With this configuration, the output of the first oxygen concentration sensor and the compensated sensor output are switched according to the detected deterioration degree of the first oxygen concentration sensor. Specifically, it is preferable to use the first oxygen concentration sensor output when the deterioration degree is small and to use the compensated sensor output when the deterioration degree becomes large for calculating the detected air-fuel ratio and the oxygen concentration. Such switching ensures accurate performance of air-fuel ratio control and catalyst deterioration detection without degrading the engine exhaust characteristics irrespective of whether the response characteristic of the first oxygen concentration sensor has deteriorated.

BRIEF DESCRIPTION OF THE DRAWINGS

FIGS. 8A and 8B are graphical representations of the time charts for illustrating the process of FIG. 7;

FIG. 9 is a graphical representation of a table referred to in the process of FIG. 7;

FIGS. 14A and 14B are graphical representations of the time charts for illustrating the process of FIG. 13;

DETAILED DESCRIPTION OF THE PREFERRED EMBODIMENTS

Preferred embodiments of the present invention will now be described with reference to the drawings.

Figure 1:
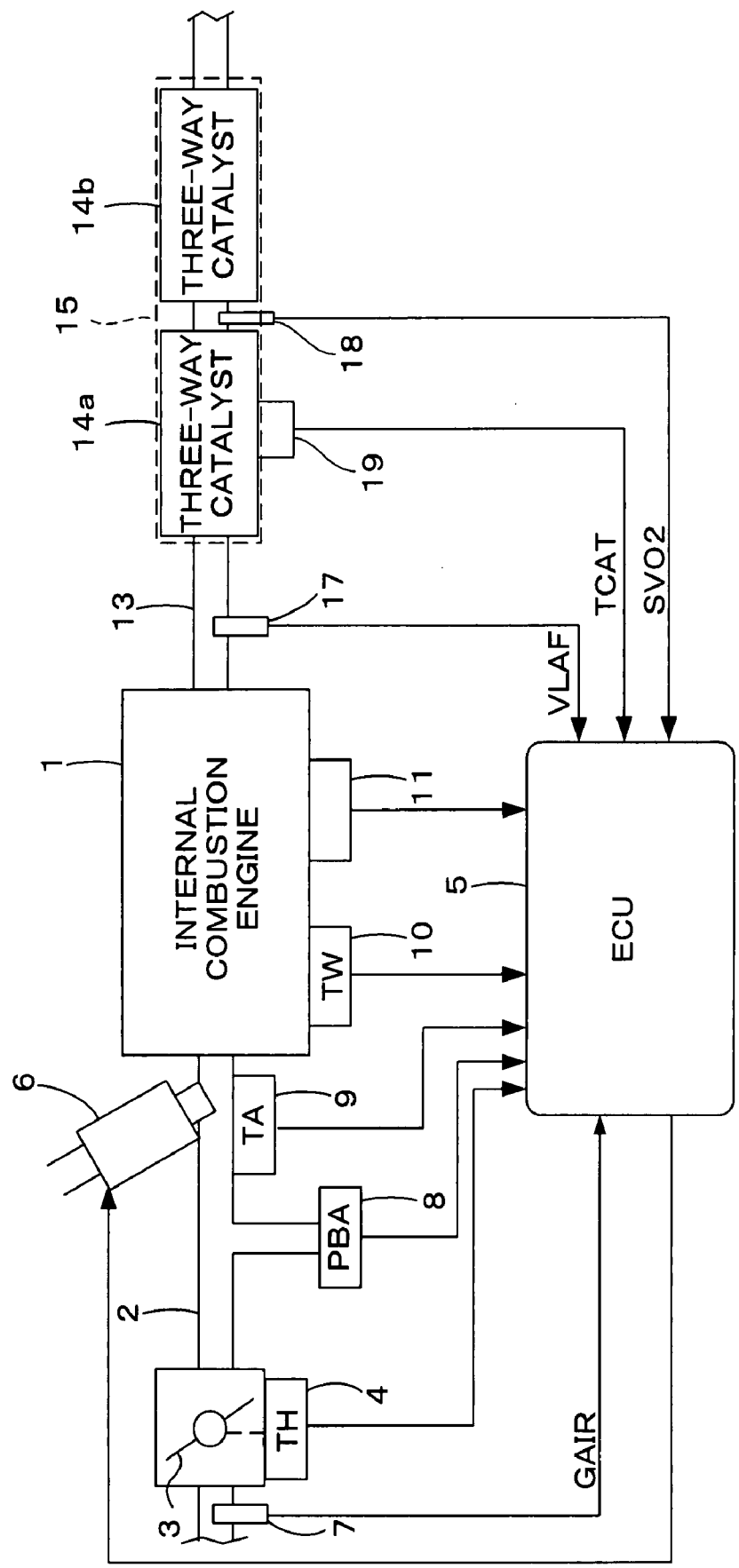
FIG. 1 is a schematic diagram of a configuration of an internal combustion engine and an air-fuel ratio control system therefor according to one embodiment of the present invention.

FIG. 1 is a schematic diagram showing a general configuration of an internal combustion engine (hereinafter referred to as "engine") and an air-fuel ratio control system therefor according to one embodiment of the present invention. The engine 1 is, for example, a four-cylinder engine having an intake pipe 2 provided with a throttle valve 3. A throttle valve opening (TH) sensor 4 is connected to the throttle valve 3, so as to output an electrical signal according to an amount of the opening of the throttle valve 3 and supply the electrical signal to an electronic control unit 5 (hereinafter referred to as "ECU").

Fuel injection valves 6 are inserted into the intake pipe 2 at locations intermediate between the cylinder block of the engine 1 and the throttle valve 3 and slightly upstream of the respective intake valves (not shown). These fuel injection valves 6 are connected to a fuel pump (not shown) and are electrically connected to the ECU 5. A valve opening period of each fuel injection valve 6 is controlled by a signal output from the ECU 5.

An intake air flow rate sensor 7 for detecting an intake air flow rate GAIR is provided upstream of the throttle valve 3. Further, an intake pressure sensor 8 for detecting an intake pressure PBA and an intake air temperature sensor 9 for detecting an intake air temperature TA are provided downstream of the throttle valve 3. The detection signals of these sensors are supplied to the ECU 5.

An engine coolant temperature (TW) sensor 10, such as a thermistor, is mounted on the body of the engine 1 to detect an engine coolant temperature TW (cooling water temperature).

A temperature signal corresponding to the detected engine coolant temperature TW is output from the sensor 10 and is supplied to the ECU 5.

A crank angle position sensor 11 for detecting a rotation angle of a crankshaft (not shown) of the engine 1 is connected to the ECU 5. A signal corresponding to the detected rotation angle of the crankshaft is supplied to the ECU 5. The crank angle position sensor 11 includes a cylinder discrimination sensor which outputs a pulse (hereinafter referred to as "CYL pulse") at a predetermined crank angle position for a specific cylinder of the engine 1. The crank angle position sensor 11 also includes a top dead center (TDC) sensor which outputs a TDC pulse at a crank angle position before a TDC of a predetermined crank angle starts at an intake stroke in each cylinder (i.e., at every 180° crank angle in the case of a four-cylinder engine), and a crank angle (CRK) sensor for generating one pulse (hereinafter referred to as "CRK pulse") with a CRK period (e.g., a period of 30°, shorter than the period of generation of the TDC pulse). The CYL pulse, the TDC pulse and the CRK pulse are supplied to the ECU 5. The CYL, TDC and CRK pulses are used to control the various timings, such as a fuel injection timing and an ignition timing, and to detect an engine rotational speed NE.

The exhaust pipe 13 is provided with a catalyst unit 15 which is configured as one container containing two sections of three-way catalysts 14a and 14b.

The three-way catalysts 14a and 14b have oxygen storing capacity and store oxygen contained in the exhaust gases in the exhaust lean condition where the air-fuel ratio of the air-fuel mixture supplied to the engine 1 is lean with respect to the stoichiometric ratio, and the oxygen concentration in the exhaust gases is therefore relatively high. The three-way catalysts oxidize HC and CO contained in the exhaust gases with the stored oxygen in the exhaust rich condition where the air-fuel ratio of the air-fuel mixture supplied to the engine 1 is rich with respect to the stoichiometric ratio, and the oxygen concentration in the exhaust gases is therefore low with a relatively large amount of HC and CO components.

A proportional type oxygen concentration sensor 17 (hereinafter referred to as "LAF sensor 17") is mounted on the upstream side of the catalyst unit 15. The LAF sensor 17 outputs the electrical signal substantially proportional to the oxygen concentration (air-fuel ratio) in the exhaust gases and supplies the electrical signal to the ECU 5.

A binary type oxygen concentration sensor 18 (hereinafter referred to as "O2 sensor") is mounted in the exhaust pipe 13 at a position between three-way catalysts 14a and 14b. The detection signal thereof is supplied to the ECU 5. The O2 sensor 18 has a characteristic such that its output rapidly changes in the vicinity of the stoichiometric ratio. Specifically, the O2 sensor 18 outputs a high-level signal during rich operation with respect to the stoichiometric ratio, and outputs a low-level signal during lean operation with respect to the stoichiometric ratio. Further, the three-way catalyst 14a is provided with a catalyst temperature sensor 19 for detecting a temperature TCAT of the three-way catalyst 14a (hereinafter referred to as "catalyst temperature"). The detection signal is supplied to the ECU 5.

The ECU 5 includes an input circuit, a central processing unit (hereinafter referred to as "CPU"), a memory circuit, and an output circuit. The input circuit performs various functions, including shaping the waveforms of input signals from various sensors, correcting the voltage levels of the input signals to a predetermined level, and converting analog signal values into digital signal values. The memory circuit preliminarily stores various operating programs to be executed by the CPU and stores the results of computations, or the like, by the CPU. The output circuit supplies control signals to the fuel injection valves 6.

The CPU in the ECU 5 determines various engine operating conditions according to various engine operating parameter signals as described above and calculates a fuel injection period TOUT of each fuel injection valve 6 to be opened in synchronism with the TDC signal pulse using equation (1) according to the above-determined engine operating conditions.

$$TOUT = TIM \times KCMD \times KAF \times K1 + K2 \qquad (1)$$

TIM is a basic fuel amount, specifically, a basic fuel injection period of each fuel injection valve 6, and is determined by retrieving a value from a TIM table set according to the intake flow rate GAIR. The TIM table is set so that the air-fuel ratio of the air-fuel mixture supplied to the engine 1 becomes substantially equal to the stoichiometric ratio.

KCMD is a target air-fuel ratio coefficient set according to the O2 sensor output SVO2 when performing a normal control. The target air-fuel ratio coefficient KCMD is proportional to the reciprocal of the air-fuel ratio A/F, i.e., proportional to a fuel-air ratio F/A, and takes a value of "1.0" for the stoichiometric ratio. Therefore, the target air-fuel ratio coefficient KCMD is referred to also as "target equivalent ratio". When performing a deterioration determination of the catalyst described below, the target air-fuel ratio coefficient KCMD is set so that the air-fuel ratio is controlled alternately to be rich with respect to the stoichiometric ratio and to be lean with respect to the stoichiometric ratio.

KAF is an air-fuel ratio correction coefficient calculated using a PID (proportional, integral, and differential) control method or an adaptive control method using a self-tuning regulator so that a detected equivalent ratio KACT calculated from a detected value of the LAF sensor 17 coincides with the target equivalent ratio KCMD when an execution condition of the air-fuel ratio feedback control is satisfied. When there is a deviation between the detected value of the LAF sensor 17 and the detected value of the O2 sensor 18, the detected equivalent ratio KACT is corrected with a correction amount PO2C described below, and a corrected equivalent ratio KACTM is calculated. That is, the air-fuel ratio correction coefficient KAF is calculated so that the corrected equivalent ratio KACTM coincides with the target equivalent ratio KCMD.

K1 and K2 are, respectively, a correction coefficient and a correction variable computed according to various engine parameter signals. The correction coefficient K1 and correction variable K2 are set to predetermined values that optimize various characteristics of the engine such as fuel consumption and engine acceleration according to the engine operating conditions.

The CPU in the ECU 5 supplies a drive signal for opening each fuel injection valve 6 according to the fuel injection period TOUT obtained as described above through the output circuit to the fuel injection valve 6. Further, the CPU in the ECU 5 performs the deterioration determination of the three-way catalyst 14a as described below. When the three-way catalyst 14a is determined to be deteriorated, it is estimated that the three-way catalyst 14b is also deteriorated to the almost same degree, and a warning lamp can be turned on.

Figure 2A:
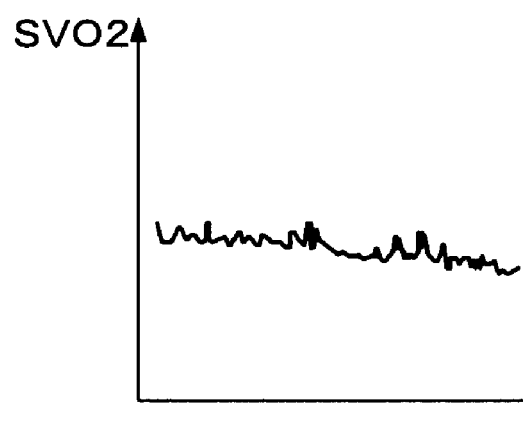
FIGS. 2A and 2B are graphical representations showing a deterioration detection method of the catalyst.
Figure 2B:
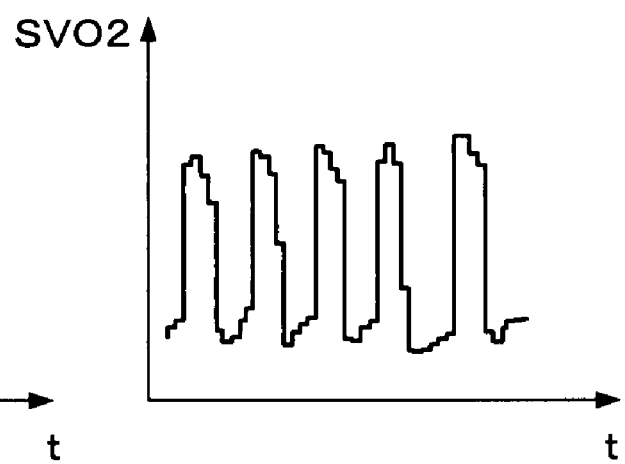

The deterioration determination of the three-way catalyst is performed based on the O2 sensor output SVO2 when changing the air-fuel ratio of the air-fuel mixture to be supplied to the engine 1 with a center of the stoichiometric ratio (when alternately performing lean operation and rich operation). As described above, the control in which lean operation and rich operation are alternately performed is hereinafter referred to as "perturbation control". Specifically, lean operation is performed for supplying oxygen to the three-way catalyst by an amount that can be stored in the normal three-way catalyst but cannot be stored in the deteriorated three-way catalyst. Thereafter, lean operation is switched to rich operation. Rich operation is performed so that almost all of the stored oxygen is discharged. When such perturbation control is performed, the output SVO2 of the O2 sensor 18 minimally changes as shown in FIG. 2A if the three-way catalyst is not deteriorated. However, if the three-way catalyst has deteriorated, the O2 sensor output SVO2 greatly changes as shown in FIG. 2B. Therefore, in this embodiment, the deterioration determination of the three-way catalyst is performed by detecting this difference in the changes of the output SVO2 of the O2 sensor 18.

Figure 3:
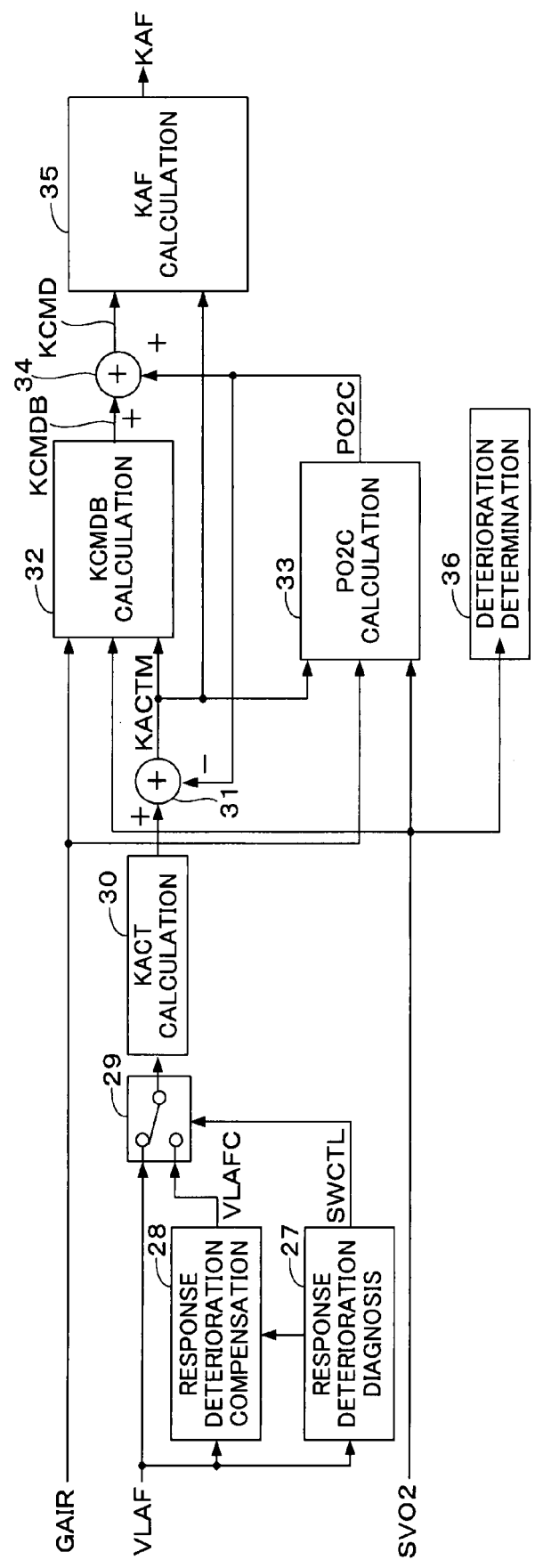
FIG. 3 is a block diagram showing a configuration of a module which performs a response deterioration compensation of an oxygen concentration sensor, the air-fuel ratio control, and a catalyst deterioration detection.

FIG. 3 is a block diagram showing a configuration of a module which performs a response deterioration diagnosis of the LAF sensor 17, the air-fuel ratio control, and the deterioration determination of the three-way catalyst. The function of each block which constitutes this module is actually realized by the process executed by the CPU in the ECU 5.

The module shown in FIG. 3 includes a response deterioration diagnosis block 27, a response deterioration compensation block 28, a switching block 29, a KACT calculation block 30, a subtracting block 31, a KCMDB calculation block 32, a PO2C calculation block 33, an adding block 34, a KAF calculation block 35, and a deterioration diagnosis block 36. The response deterioration diagnosis block 27 performs the response deterioration diagnosis of the LAF sensor 17 based on an output VLAF of the LAF sensor 17. The response deterioration compensation block 28 performs a response deterioration compensating calculation of the LAF sensor output VLAF and outputs a compensated sensor output VLAFC. The KACT calculation block 30 converts the LAF sensor output VLAF or the compensated sensor output VLAFC output from the switching block 29 to the equivalent ratio to calculate the detected equivalent ratio KACT. The KCMDB calculation block 32 calculates a basic value KCMDB of the target equivalent ratio. The PO2C calculation block 33 calculates the correction amount PO2C for correcting the detected equivalent ratio KACT. The KAF calculation block 35 calculates the air-fuel ratio correction coefficient KAF. The deterioration diagnosis block 36 performs the deterioration diagnosis of the three-way catalyst 14a.

Figure 4:
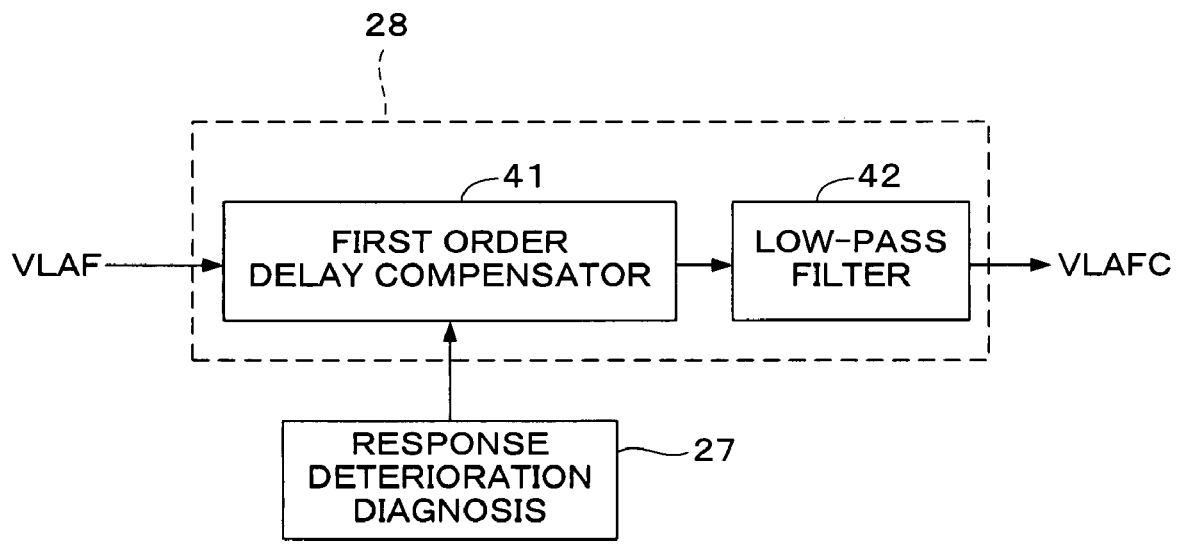
FIG. 4 is a block diagram showing a configuration of the response deterioration compensation block which performs the response deterioration compensation of the oxygen concentration sensor.

As shown in FIG. 4, the response deterioration compensation block 28 consists of a first-order delay compensator 41 and a low-pass filter 42. Based on the LAF sensor output VLAF sampled at the time of starting the fuel cut operation in which the supply of fuel to the engine 1 is interrupted, the response deterioration diagnosis block 27 calculates a first delay time constant T and generates a switching control signal SWCTL according to the first-order delay time constant T. Specifically, when the first-order delay time constant T is equal to or less than a predetermined time period TDTH (for example, 200 milliseconds), the switching control signal SWCTL is set to "0". When the first-order delay time constant T is greater than the predetermined time period TDTH, the switching control signal SWCTL is set to "1". The switching block 29 selects the LAF sensor output VLAF when the switching control signal SWCTL is equal to "0" and selects the compensated sensor output VLAFC when the switching control signal SWCTL is equal to "1".

Figure 5:
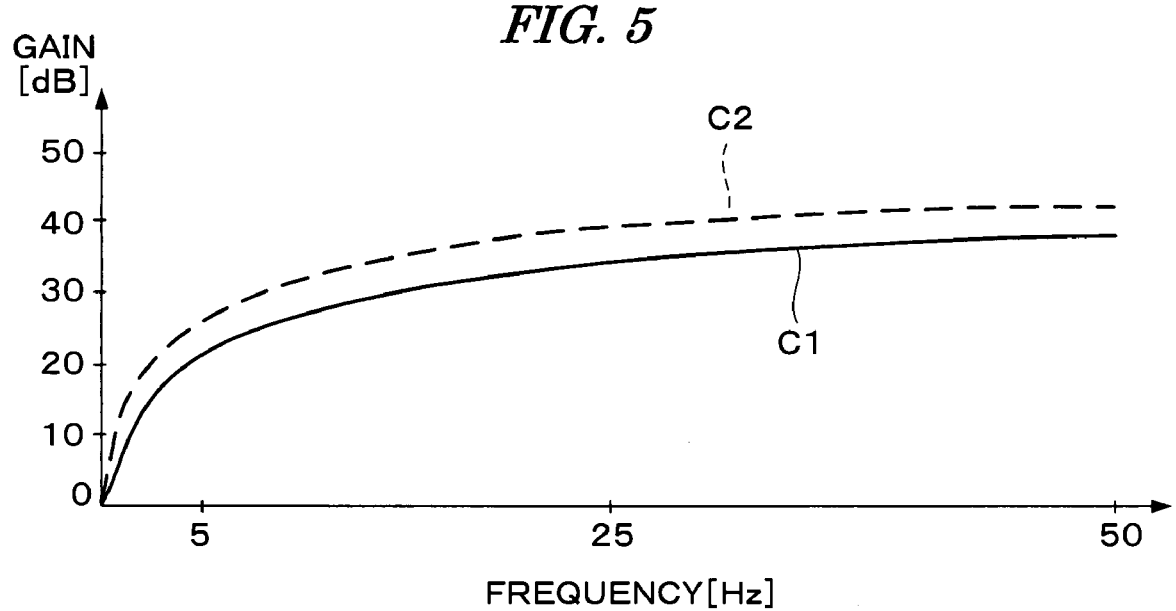
FIG. 5 is a graph showing frequency characteristics of the first-order delay compensator shown in FIG. 4.

The first-order delay compensator 41 calculates a first-order delay compensated output VLAFC1 by equation (2). In equation (2), "k" is a calculation time digitized with the execution period of the calculation (for example, 10 milliseconds), and TD is a time constant parameter corresponding to the first-order delay time constant T input from the response deterioration diagnosis block 27. In this embodiment, since the execution period of the calculation is 10 milliseconds, the time constant parameter TD is equal to "T [ms]/10 [ms]". The first-order delay compensator 41 is an amplifier which amplifies the input signal by emphasizing the high-frequency component of the input signal. The frequency characteristics are graphically shown in FIG. 5. The frequency characteristic C1, as shown by the solid line in FIG. 5, corresponds to a case where the first-order delay time constant T is 300 milliseconds, and the frequency characteristic C2, as shown by the dashed line, corresponds to a case where the first-order delay time constant T is 720 milliseconds.

$$VLAFC1(k)=(TD+1) \times VLAF(k)-TD \times (k-1) \quad (2)$$

The low-pass filter 42 is inserted in order to remove noise components. The first-order delay compensated output VLAFC1 is applied to equation (3) to calculate the compensated sensor output VLAFC. The cutoff frequency of the low-pass filtering by equation (3), for example, is set to 5 Hz.

$$VLAFC(k)=b0 \cdot VLAFC1(k)+b1 \cdot VLAFC1(k-1)+ \ldots + bm \cdot VLAFC1(k-m)+a1 \cdot VLAFC(k-1)+a2 \cdot VLAFC(k-2)+ \ldots +an \cdot VLAFC(k-n) \quad (3)$$

where "b0" to "bm" and "a1" to "an" are filtering coefficients, and "m" and "n" are set respectively to 3 and 2, for example.

The subtracting block 31 subtracts the correction amount PO2C from the detected equivalent ratio KACT to calculate the corrected equivalent ratio KACTM. The KCMDB calculation block 32 calculates the basic value KCMDB according to the intake air flow rate GAIR, the corrected equivalent ratio KACTM, and the O2 sensor output SVO2. Specifically, the KCMDB calculation block 32 sets the basic value KCMDB so that the perturbation control is executed, alternately performing rich operation and lean operation.

The PO2C calculation block 33 calculates the correction amount PO2C of the detected equivalent ratio KACT according to the intake air flow rate GAIR, the corrected equivalent ratio KACTM, and the O2 sensor output SVO2. The correction amount PO2C is a parameter for correcting a deviation of the detected equivalent ratio KACT caused by an aging (except the response deterioration) of the detecting characteristic of the LAF sensor 17 or a change in the operating condition of the engine 1.

The adding block 34 adds the correction amount PO2C to the basic value KCMDB to calculate the target equivalent ratio KCMD. The KAF calculation block 35 calculates the air-fuel ratio correction coefficient KAF so that the corrected equivalent ratio KACTM coincides with the target equivalent ratio KCMD.

The deterioration determination block 36 determines the deterioration of the three-way catalyst 14a according to the O2 sensor output SVO2 when performing perturbation control.

Figure 6:
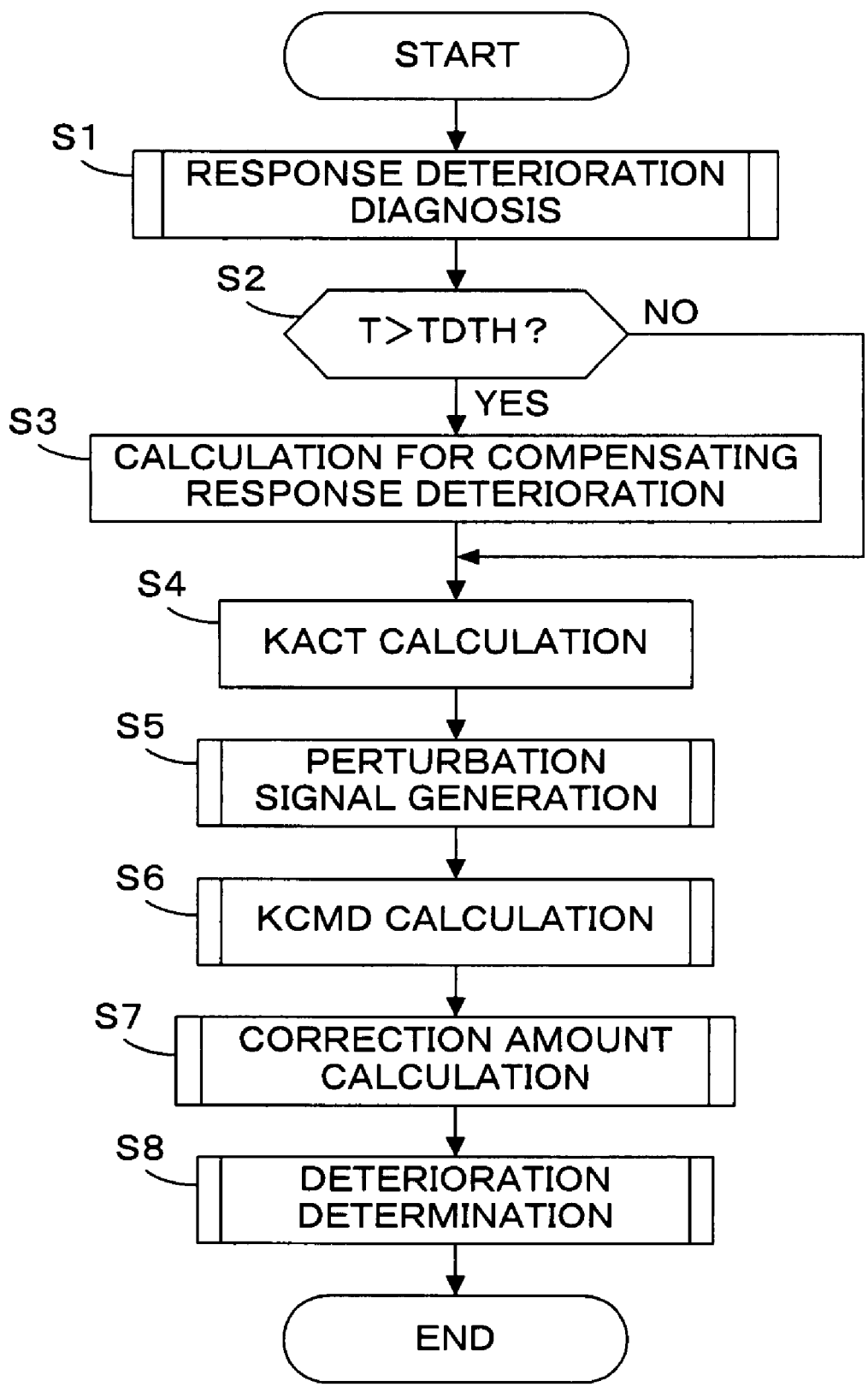
FIG. 6 is a flowchart of a process for implementing functions of the blocks which constitute the module shown in FIG. 3.

FIG. 6 is a flowchart showing a main routine of an operation process for implementing the functions of the response deterioration diagnosis block 27, the response deterioration compensation block 28, the switching block 29, the KACT calculation block 30, the subtracting block 31, the KCMDB calculation block 32, the PO2C calculation block 33, the adding block 34, and the deterioration determination block 36 described above. This process is executed by the CPU in the ECU 5 at predetermined time intervals (for example, 10 milliseconds).

Figure 7:
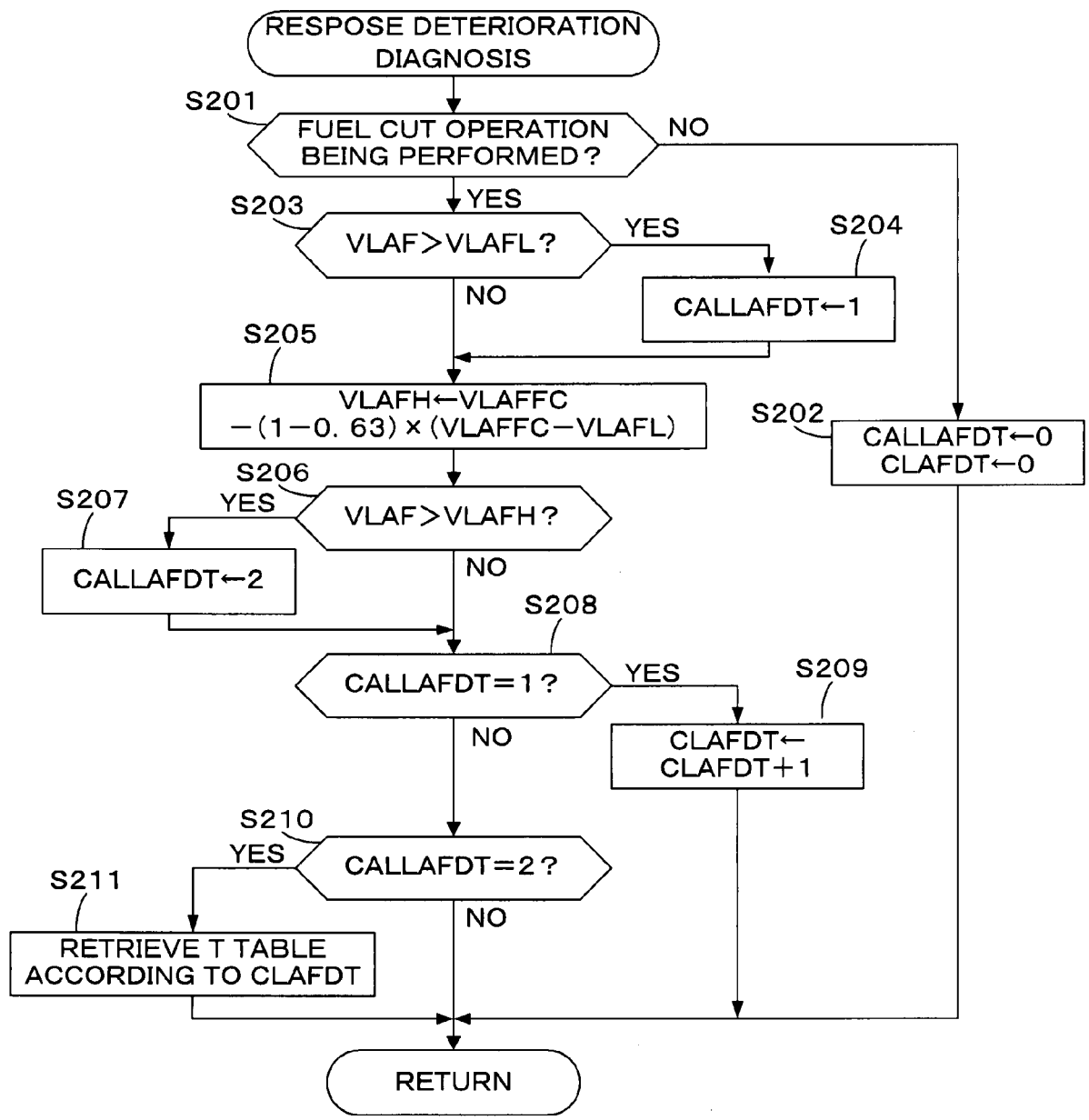
FIG. 7 is a flowchart of the response deterioration diagnosis process executed in the process of FIG. 6.

In step S1, the response deterioration diagnosis process shown in FIG. 7 is executed to calculate the first-order delay time constant T. In step S2, whether the calculated first-order delay time constant T is greater than the predetermined time period TDTH is determined. If the answer to step S2 is negative (NO), indicating that the response characteristic of the LAF sensor 17 is not deteriorated, the process immediately proceeds to step S4.

If T is greater than TDTH in step S2, the response deterioration compensating calculation is performed in step S3 using the above-described equations (2) and (3) to calculate the compensated sensor output VLAFC. In step S4, the detected equivalent ratio KACT is calculated from the LAF sensor output VLAF or the compensated sensor output VLAFC.

Figure 10:
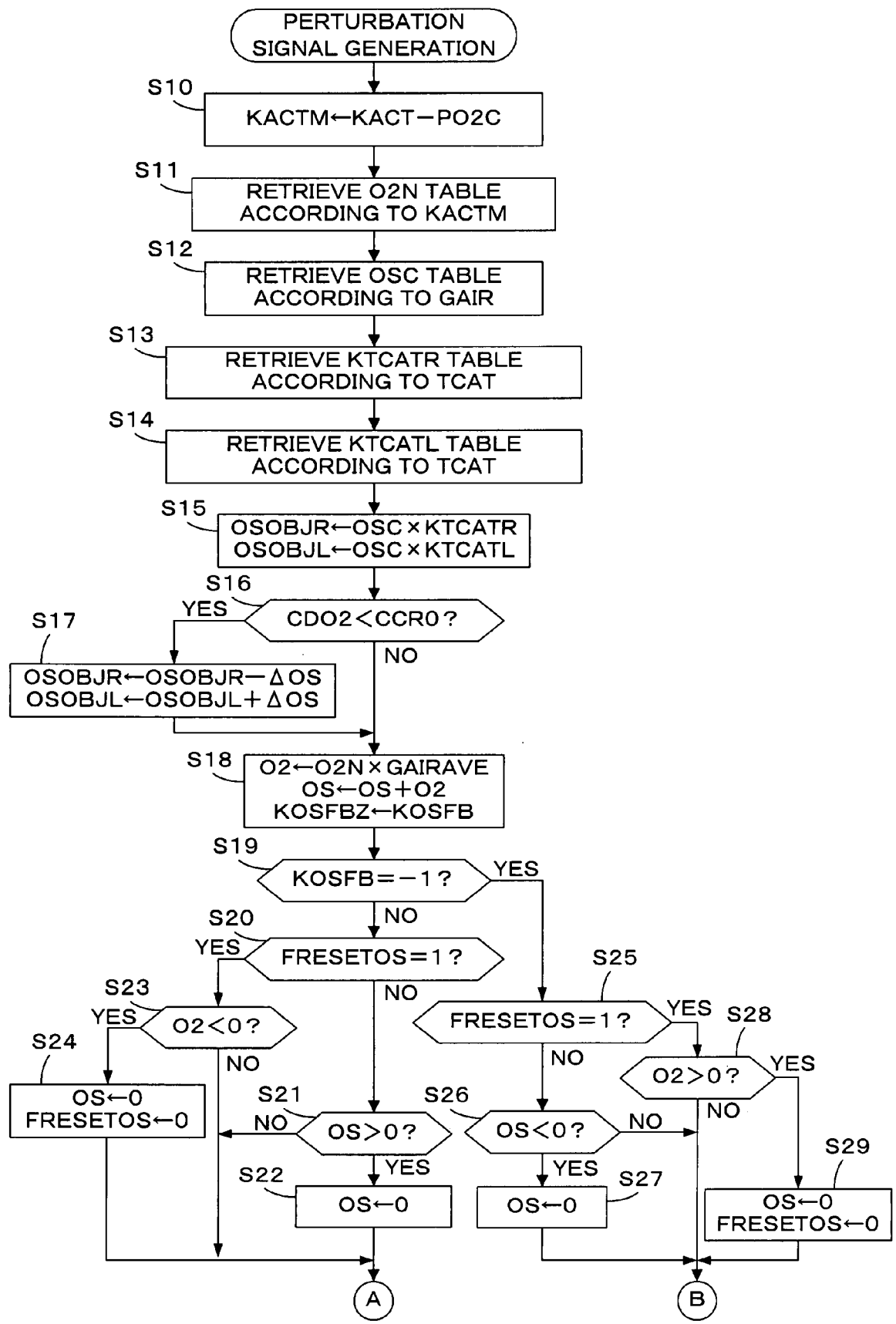
FIG. 10 is a portion of a flowchart of the perturbation signal generation process executed in the process of FIG. 6.
Figure 11:
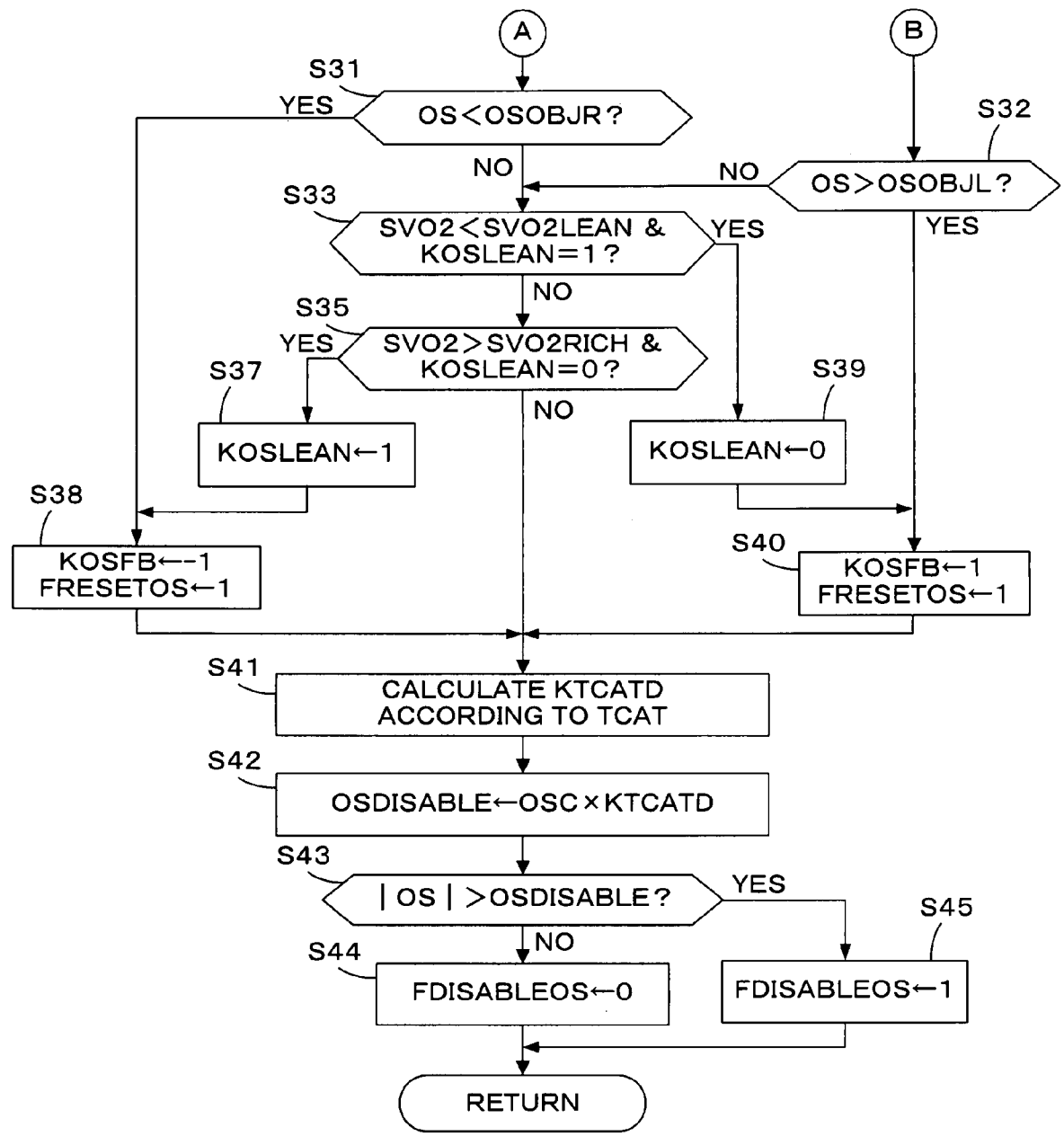
FIG. 11 is the remainder of the flowchart of the perturbation signal generation process executed in the process of FIG. 6.
Figure 13:
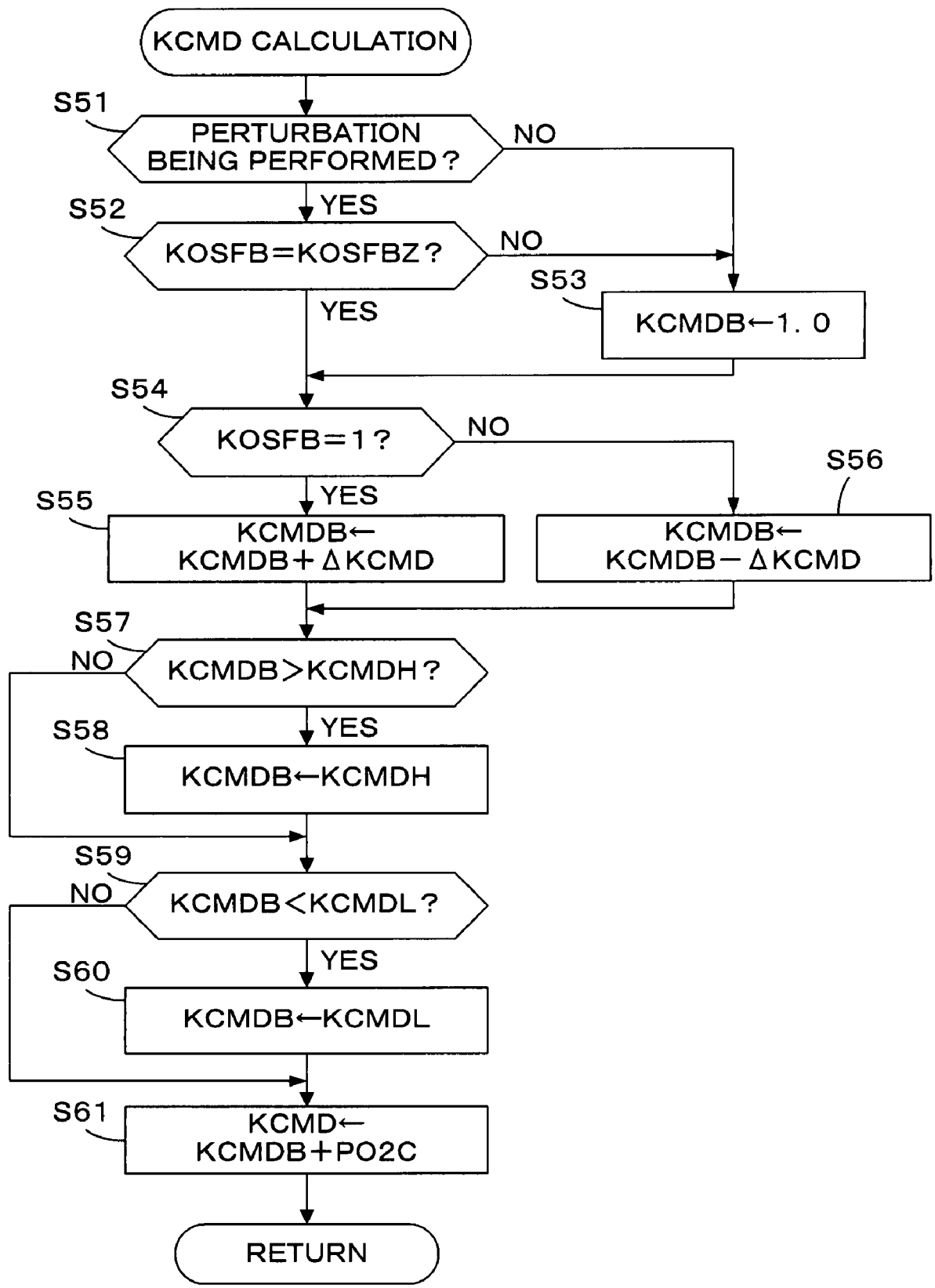
FIG. 13 is a flowchart of the KCMD calculation process executed in the process of FIG. 6.

In step S5, the process shown in FIGS. 10 and 11 is executed to generate a perturbation signal for changing the air-fuel ratio. Specifically, the generation of the perturbation signal corresponds to setting an air-fuel ratio switching parameter KOSFB to "1" or "−1". In step S6, the process shown in FIG. 13 is executed to set the target air-fuel ratio coefficient KCMD according to the air-fuel ratio switching parameter KOSFB. During normal control, the target air-fuel ratio coefficient KCMD is set according to the output SVO2 of the O2 sensor 18. When performing the deterioration determination of the three-way catalyst, the target air-fuel ratio coefficient KCMD is set according to the air-fuel ratio switching parameter KOSFB that is set in step S5, thereby performing perturbation control of the air-fuel ratio.

Figure 15:
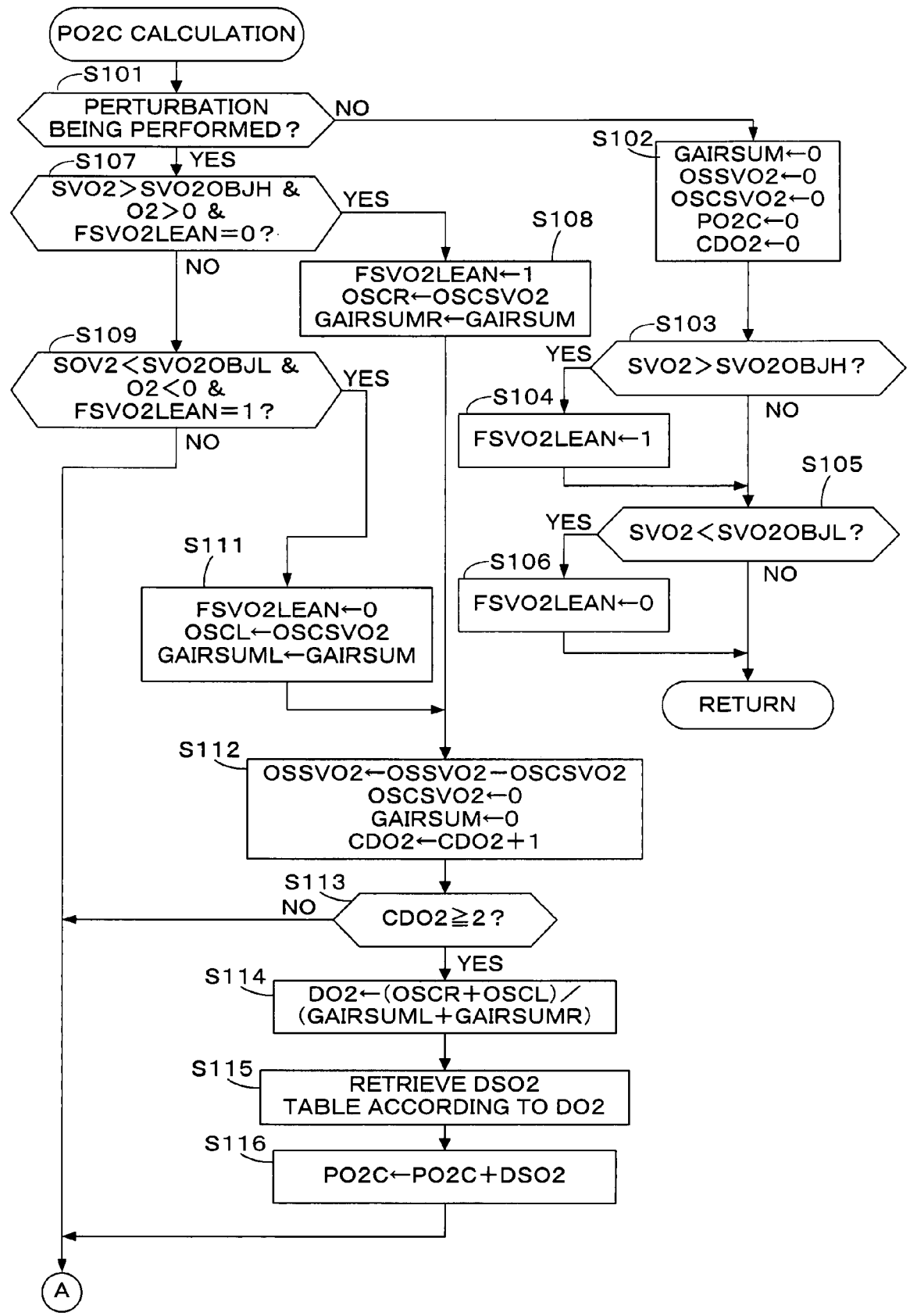
FIG. 15 is a portion of a flowchart of the correction amount (PO2C) calculation process executed in the process of FIG. 6.
Figure 16:
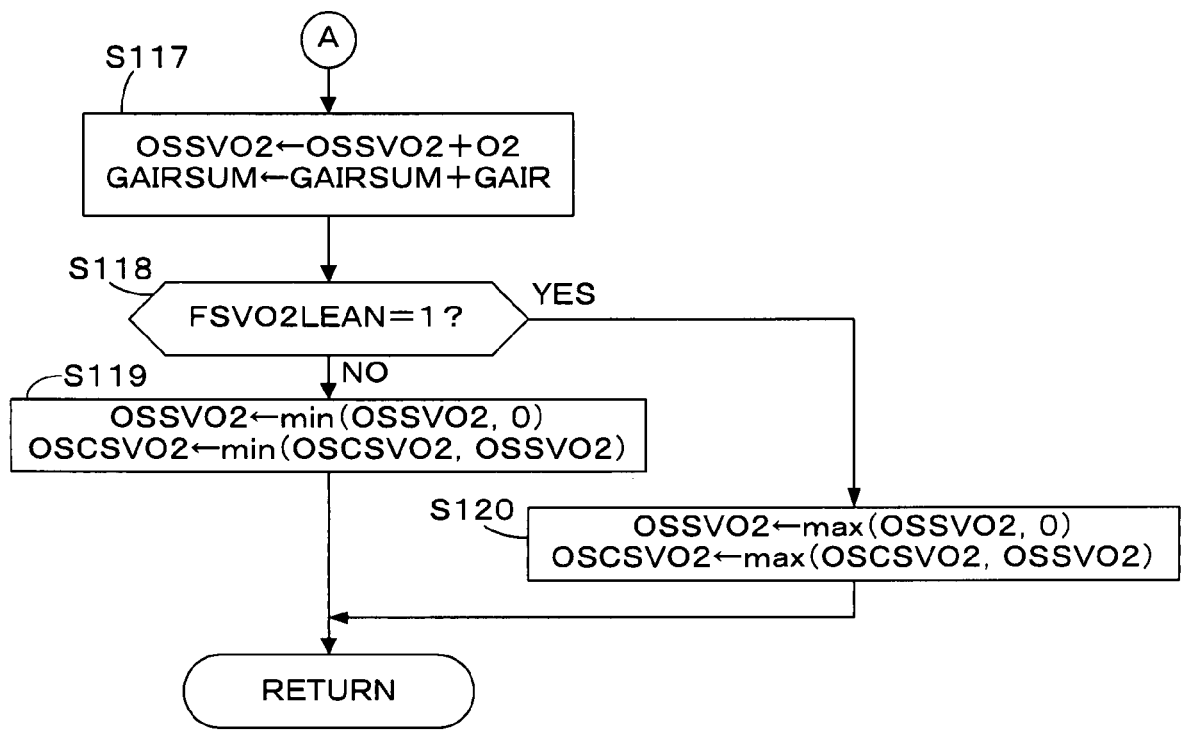
FIG. 16 is the remainder of the flowchart of the correction amount (PO2C) calculation process executed in the process of FIG. 6.

In step S7, the process shown in FIGS. 15 and 16 is executed to calculate the correction amount PO2C of the detected equivalent ratio KACT.

Figure 19:
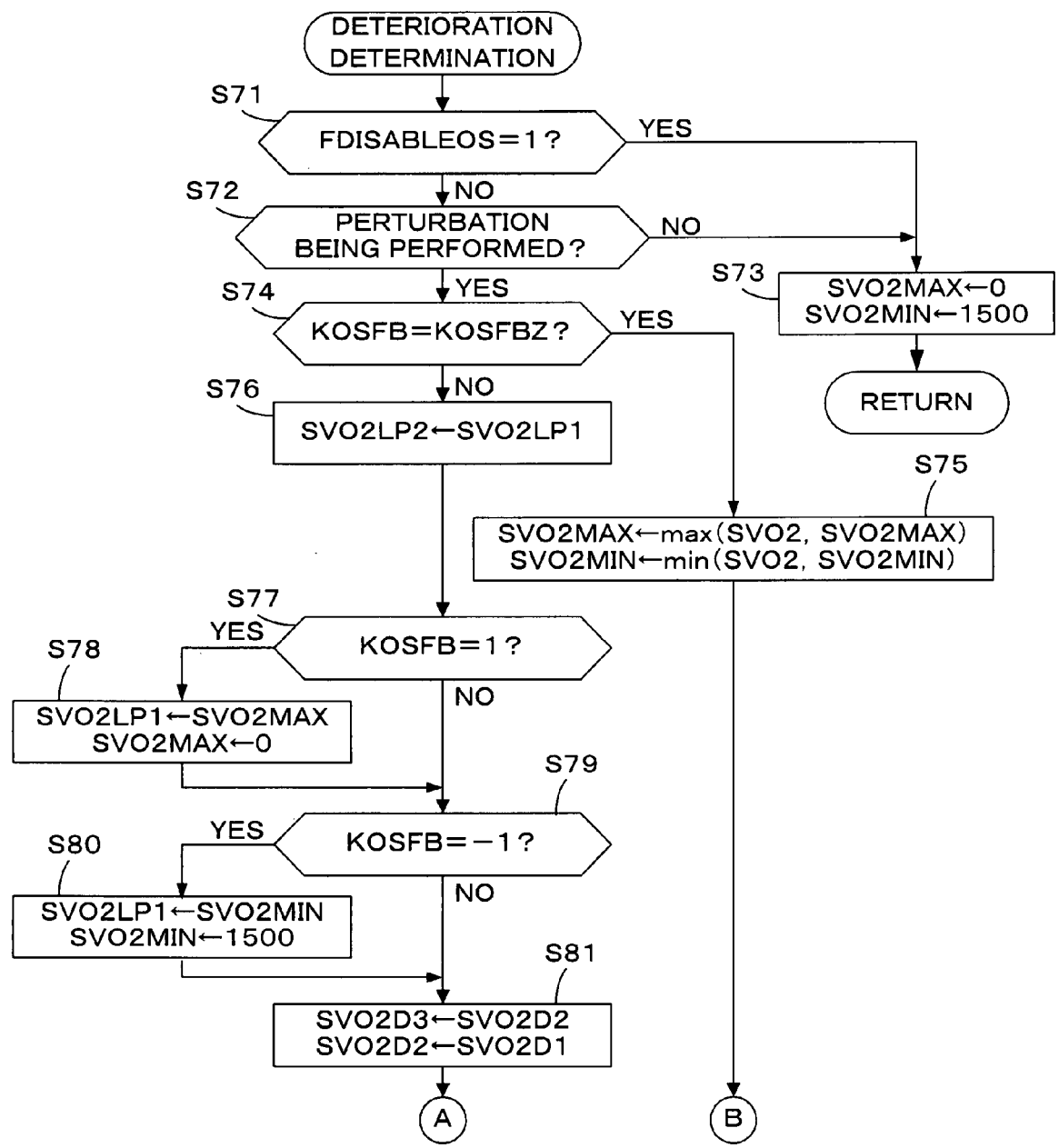
FIG. 19 is a portion of a flowchart of the deterioration determination process executed in the process of FIG. 6.
Figure 20:
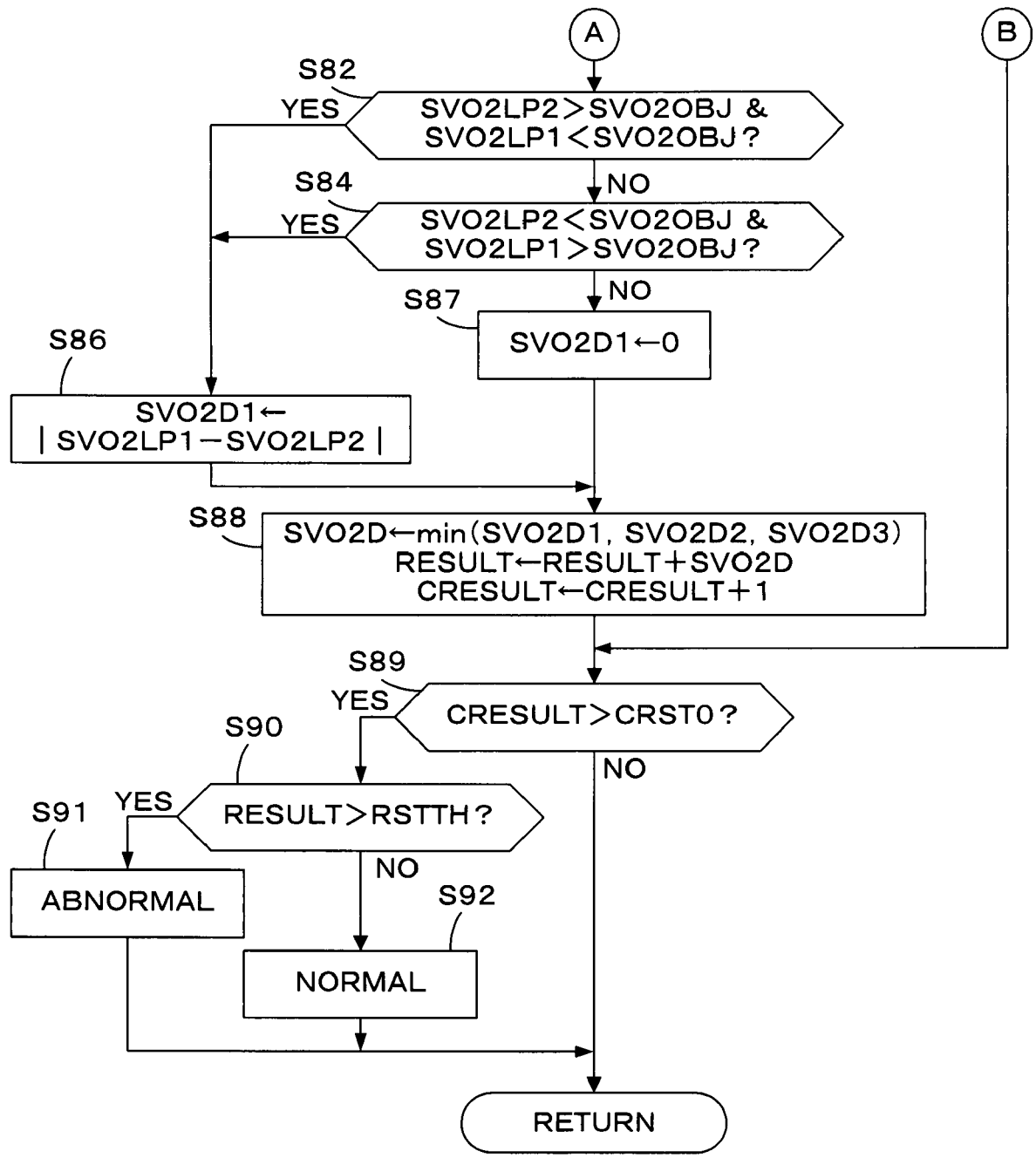
FIG. 20 is the remainder of the flowchart of the deterioration determination process executed in the process of FIG. 6.

In step S8, the process shown in FIGS. 19 and 20 is executed, and a determination parameter RESULT indicative of the deterioration degree of the three-way catalyst 14a is calculated based on the O2 sensor output SVO2 when performing perturbation control. If the determination parameter RESULT exceeds a determination threshold value RSTTH, the three-way catalyst 14a is determined to be deteriorated beyond an acceptable amount.

FIG. 7 is a flowchart of the response deterioration diagnosis process executed in step S1 of FIG. 6. FIGS. 8A and 8B are graphical time charts for illustrating the process of FIG. 7. These figures are referred to in the following description.

In step S201, whether fuel cut operation is being performed (FIG. 8A, FFC=1) is determined. If fuel cut operation is not being performed (FFC=0), both an output level parameter CALLAFDT and a delay time period parameter CLAFDT are set to "0" in step S202 and the process ends.

When the fuel cut operation is being performed, the process proceeds from step S201 to step S203, wherein whether the LAF sensor output VLAF is greater than a predetermined sensor output value VLAFL (for example, 3.0V) is determined. Since the answer to step S203 is negative (NO) at the beginning of fuel cut operation, the process immediately proceeds to step S205. If the LAF sensor output VLAF exceeds the predetermined sensor output value VLAFL, the process proceeds from step S203 to S204, wherein the output level parameter CALLAFDT is set to "1". Thereafter, the process proceeds to step S205.

In step S205, a maximum value VLAFFC (for example, 4.04V) of the LAF sensor output during the fuel cut operation and the predetermined sensor output value VLAFL are applied to equation (4) to calculate a sensor output threshold value VLAFH.

$$VLAFH = VLAFFC - (1 - 0.63) \times (VLAFFC - VLAFL) \quad (4)$$

In step S206, whether the LAF sensor output VLAF is greater than the sensor output threshold value VLAFH is determined. Since the answer to step S206 is initially negative (NO), the process immediately proceeds to step S208, wherein whether the output level parameter CALLAFDT is equal to "1" is determined. At first, the answer to step S208 is also negative (NO). Accordingly, the process proceeds to step S210, wherein whether the output level parameter CALLAFDT is equal to "2" is determined. Since the answer to step S210 is also negative (NO) at first, the process immediately ends.

If the LAF sensor output VLAF increases and exceeds the predetermined sensor output value VLAFL (FIG. 8B, time tr1), the output level parameter CALLAFDT is set to "1" in step S204. Consequently, the answer to step S208 becomes affirmative (YES), and the delay time period parameter CLAFDT is incremented by "1" in step S209. Thereafter, step S209 is repeatedly executed and the delay time period parameter CLAFDT increases until the answer to step S206 becomes affirmative (YES).

In step S206, if the LAF sensor output VLAF exceeds the sensor output threshold value VLAFH (FIG. 8B, time tr2), the process proceeds to step S207, wherein the output level parameter CALLAFDT is set to "2". The value of the delay time period parameter CLAFDT at time tr2 is proportional to the time period (delay time period) from time tr1 to time tr2 of FIG. 8B.

By executing step S207, the answer to step S208 becomes negative (NO). Further, the answer to step S210 becomes affirmative (YES). Accordingly, the process proceeds to step S211, wherein a "T" table graphically shown in FIG. 9 is retrieved according to the delay time period parameter CLAFDT to calculate the first-order delay time constant T.

By the process of FIG. 7, the first-order delay time constant T is calculated according to the delay time period parameter CLAFDT which indicates the rising characteristic of the LAF sensor output. If the first-order delay time constant T becomes greater than the predetermined time period TDTH, the detected equivalent ratio KACT is calculated from the compensated sensor output VLAFC calculated by equation (3) of the low-pass filtering and equation (2) to which the first-order time constant T is applied, instead of directly using the LAF sensor output VLAF. Therefore, even if the response characteristic of the LAF sensor 17 has deteriorated, the air-fuel ratio control and the catalyst deterioration detection described below can be performed with high accuracy.

FIGS. 10 and 11 show a flowchart of the perturbation signal generation process executed in step S5 of FIG. 6.

Figure 12:
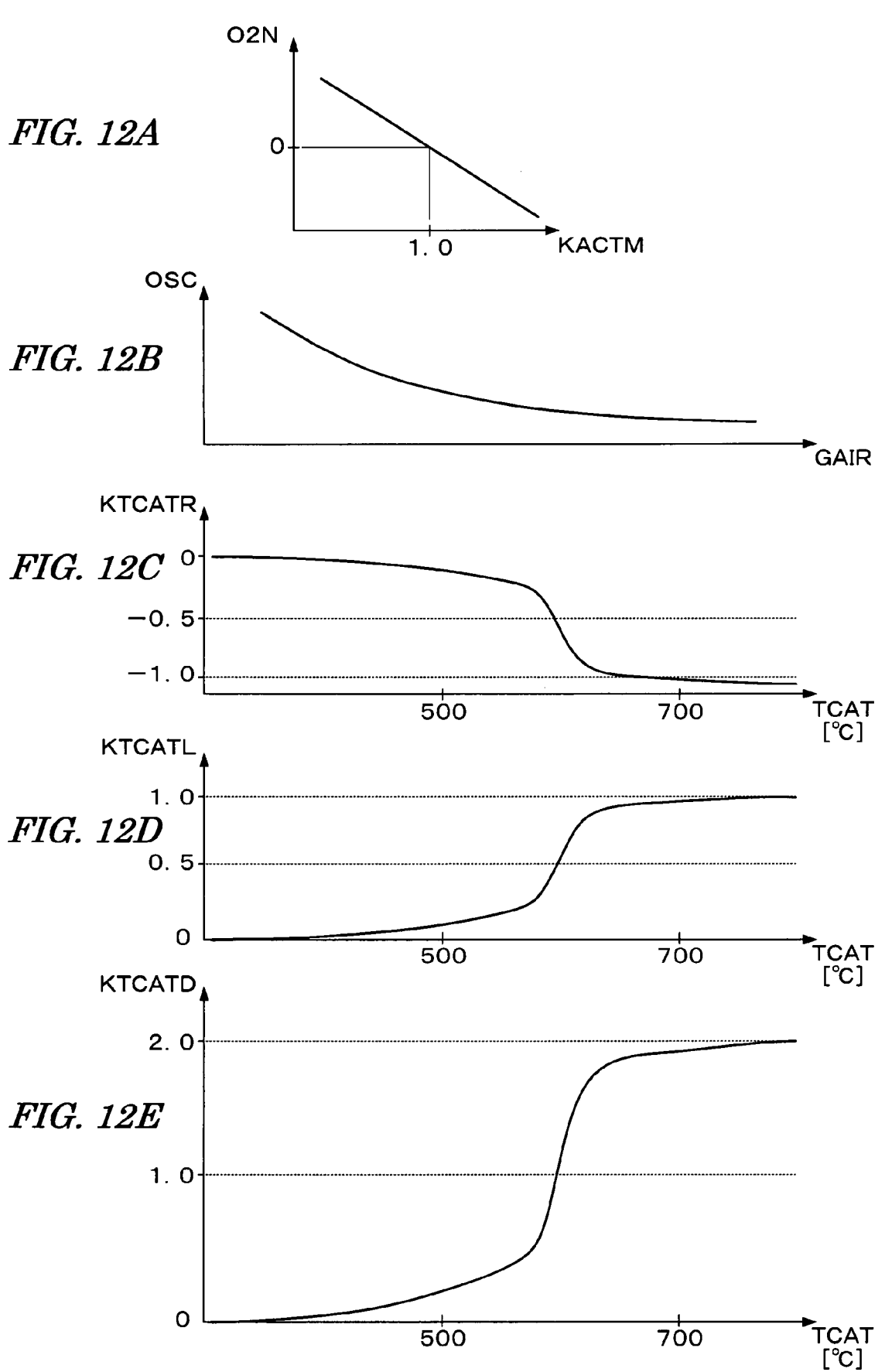
FIGS. 12A-12E are graphical representations of tables referred to in the process of FIG. 10 and FIG. 11.

In step S10, the corrected equivalent ratio KACTM is calculated by subtracting the correction amount PO2C from the detected equivalent ratio KACT. In step S11, an O2N table graphically shown in FIG. 12A is retrieved according to the corrected equivalent ratio KACTM to calculate an oxygen concentration parameter O2N proportional to an oxygen concentration in exhaust gases. The O2N table is set as follows: the oxygen concentration parameter O2N is set to "0" when the oxygen concentration detected by the LAF sensor 17 is equal to an oxygen concentration O2ST (KACTM=1.0) corresponding to the stoichiometric ratio; the oxygen concentration parameter O2N is set to a positive value when the oxygen concentration detected by the LAF sensor 17 is higher than the oxygen concentration O2ST (when the air-fuel ratio is lean with respect to the stoichiometric ratio); and the oxygen concentration parameter O2N is set to a negative value when the oxygen concentration detected by LAF sensor 17 is lower than the oxygen concentration O2ST (when the air-fuel ratio is rich with respect to the stoichiometric ratio).

In step S12, an OSC table graphically shown in FIG. 12B is retrieved according to the intake air flow rate GAIR to calculate a reference oxygen amount OSC[g] which is a reference of a deteriorated catalyst. The OSC table is set so that the reference oxygen amount OSC decreases as the intake air flow rate GAIR increases. The time period which is necessary for the exhaust gases to pass through the three-way catalyst becomes shorter as the intake air flow rate GAIR increases. However, a reaction rate (accumulation rate of oxygen) in the three-way catalyst is substantially constant if a catalyst temperature and a difference (b−a) between the oxygen concentration (a) in the exhaust gases flowing into the three-way catalyst and the oxygen concentration (b) in the exhaust gases that exist in the three-way catalyst are constant. Therefore, the amount of oxygen which can be stored in the three-way catalyst decreases as the intake air flow rate GAIR increases. Consequently, the OSC table is set as shown in FIG. 12B.

In step S13, a KTCATR table graphically shown in FIG. 12C is retrieved according to the catalyst temperature TCAT to calculate a first temperature correction coefficient KTCATR. The KTCATR table is set so that the first temperature correction coefficient KTCATR takes a negative value and decreases (the absolute value of KTCATR increases) as the catalyst temperature TCAT rises.

In step S14, a KTCATL table graphically shown in FIG. 12D is retrieved according to the catalyst temperature TCAT to calculate a second temperature correction coefficient KTCATL. The KTCATL table is set so that the second temperature correction coefficient KTCATL takes a positive value and increases as the catalyst temperature TCAT rises.

In step S15, the reference oxygen amount OSC and the temperature correction coefficients KTCATR and KTCATL are applied to equations (5) and (6) to calculate a rich limit value OSOBJR and a lean limit value OSOBJL.

$$OSOBJR = OSC \times KTCATR \qquad (5)$$

$$OSOBJL = OSC \times KTCATL \qquad (6)$$

The rich limit value OSOBJR and the lean limit value OSOBJL, which are calculated as described above, are target values of an inflowing oxygen amount OS calculated in step S18 and are used as a threshold value for determining the timing of switching the air-fuel ratio in step S31 or step S32 described below. The lean limit value OSOBJL corresponds to an amount of the inflowing oxygen that the normal three-way catalyst can store but the deteriorated three-way catalyst cannot store. The rich limit value OSOBJR is set to a negative value whose absolute value is substantially equal to the lean limit value OSOBJL. In other words, the rich limit value OSOBJR and the lean limit value OSOBJL are set so that the O2 sensor output SVO2 minimally changes when the three-way catalyst is normal, and the O2 sensor output SVO2 greatly changes when the three-way catalyst is deteriorated.

In step S16, whether a value of a counter CDO2 is less than a predetermined value CCR0 (for example, 2) is determined. The counter CDO2 is incremented in step S112 of FIG. 15 described below and counts a number of times the calculation of the parameter was required in order to calculate the correction amount PO2C. When the O2 sensor output SVO2 has at least twice turned over (changed from a value indicative of a lean air-fuel ratio to a value indicative of a rich air-fuel ratio, or vice versa) after perturbation control starts, calculation of the correction amount PO2C becomes possible. Therefore, if CDO2 is less than CCR0 in step S16, the rich limit value OSOBJR is made to decrease and the lean limit value OSOBJL is made to increase by equations (7a) and (7b) in step S17.

$$OSOBJR = OSOBJR - \Delta OS \qquad (7a)$$

$$OSOBJL = OSOBJL + \Delta OS \qquad (7b)$$

According to steps S16 and S17, the O2 sensor output SVO2 is reliably made to turn over CCR0 times, and the correction amount PO2C can be calculated.

In step S18, the oxygen concentration parameter O2N is applied to equation (8) to calculate the inflowing oxygen flow rate O2. The inflowing oxygen flow rate O2 is applied to equation (9) to calculate the first inflowing oxygen amount OS. Further, a preceding value KOSFBZ of the air-fuel ratio switching parameter is set to the present value KOSFB.

$$O2 = O2N \times GAIRAVE \qquad (8)$$

$$OS = OS + O2 \qquad (9)$$

In equation (8), GAIRAVE is a moving average value of, for example, about six data of the intake air flow rate GAIR. The OS on the right side of equation (9) is a preceding calculated value. The calculation process (not shown) of the averaging air flow rate GAIRAVE is executed in synchronism with generating of the CRK pulse.

In step S19, whether the air-fuel ratio switching parameter KOSFB is equal to "−1" is determined. If the answer to step S19 is affirmative (YES) which indicates that the engine 1 is in the lean operating condition, whether a reset flag FRESETOS is equal to "1" is determined in step S25. The reset flag FRESETOS is set to "1" when the value of the air-fuel ratio switching parameter KOSFB is changed (refer to steps S38 and S40). Since the answer to step S25 is affirmative (YES) immediately after the air-fuel ratio switching parameter KOSFB is changed to "−1", the process proceeds to step S28, wherein whether the inflowing oxygen flow rate O2 is a positive value is determined. The answer to step S28 is negative (NO) at the beginning of lean operation, and the process immediately proceeds step S32 (FIG. 11). If the lean operation is performed and the oxygen concentration in exhaust gases becomes high, the answer to step S28 becomes affirmative (YES). The process then proceeds to step S29, wherein the first inflowing oxygen amount OS is set to "0" and the reset flag FRESETOS is returned to "0". Thereafter, the process proceeds to step S32.

If the reset flag FRESETOS is returned to "0", the answer to step S25 becomes negative (NO), and the process proceeds to step S26, wherein whether the first inflowing oxygen amount OS is a negative value is determined. Since the answer to step S26 is normally negative (NO), the process immediately proceeds to step S32. If the first inflowing oxygen amount OS is a negative value, the inflowing oxygen amount OS is reset to "0" (step S27), and the process proceeds to step S32.

In step S32, whether the first inflowing oxygen amount OS is greater than the lean limit value OSOBJL is determined. Since the answer to step S32 is negative (NO) at the beginning of lean operation, the process proceeds to step S33, wherein whether the O2 sensor output SVO2 is less than a first lean predetermined value SVO2 LEAN and whether a downstream oxygen concentration parameter KOSLEAN is equal to "1" (step S33) are determined. The first lean predetermined value SVO2 LEAN corresponds to an air-fuel ratio which is slightly leaner than the stoichiometric ratio. The downstream oxygen concentration parameter KOSLEAN is set to "0" when the O2 sensor output. SVO2 takes a value indicative of a lean air-fuel ratio (refer to step S39). Since the answer to step S33 is normally negative (NO), the process proceeds to step S35, wherein whether the O2 sensor output SVO2 is greater than a first rich predetermined value SVO2RICH (>SVO2LEAN) and whether the downstream oxygen concentration parameter KOSLEAN is equal to "0" are determined. The first rich predetermined value SVO2RICH corresponds to an air-fuel ratio which is slightly richer than the stoichiometric ratio. Since the answer to step S35 is also normally negative (NO), the process immediately proceeds to step S41.

Thereafter, if lean operation continues, the first inflowing oxygen amount OS gradually increases. If the first inflowing oxygen amount OS exceeds the lean limit value OSOBJL in step S32, the process proceeds to step S40, wherein the air-fuel ratio switching parameter KOSFB is set to "1" and the reset flag FRESETOS is set to "1", thereby starting rich operation.

If the air-fuel ratio switching parameter KOSFB is changed from "−1" to "1", the process proceeds from step S19 to step S20, wherein whether the reset flag FRESETOS is equal to "1" is determined. Since the answer to step S20 is initially affirmative (YES), the process proceeds to step S23, wherein whether the inflowing oxygen flow rate O2 is a negative value is determined. At the beginning of rich operation, the answer to step S23 is negative (NO), and the process immediately proceeds to step S31 (FIG. 11). When the oxygen concentration in exhaust gases decreases after starting rich operation, the answer to step S23 becomes affirmative (YES), and the process proceeds to step S24, wherein the first inflowing oxygen amount OS is set to "0" and the reset flag FRESETOS is returned to "0". Then the process proceeds to step S31. The first inflowing oxygen amount OS thereafter takes a negative value during rich operation. This means that reducing components (HC, CO) are supplied to the three-way catalyst 14a, and the accumulated oxygen therein is used for oxidizing the reducing components and decreases (flows out from the catalyst 14a).

If the reset flag FRESETOS is returned to "0", the answer to step S20 becomes negative (NO), and the process proceeds to step S21, wherein whether the first inflowing oxygen amount OS is a positive value is determined. Since the answer to step S20 is normally negative (NO), the process immediately proceeds to step S31. If the first inflowing oxygen amount OS is a positive value, the inflowing oxygen amount OS is reset to "0" (step S22), and the process proceeds to step S31.

In step S31, whether the first inflowing oxygen amount OS is less than the rich limit value OSOBJR is determined. Since the answer to step S31 is negative (NO) at the beginning of rich operation, the process proceeds to step S33 described above. Normally, both of the answers to steps S33 and S35 are negative (NO).

Thereafter, if rich operation continues, the first inflowing oxygen amount OS gradually decreases (the absolute value of the negative value increases). If the first inflowing oxygen amount OS becomes less than the rich limit value OSOBJR in step S31, the process proceeds to step S38, wherein the air-fuel ratio switching parameter KOSFB is set to "−1" and the reset flag FRESETOS is set to "1", thereby starting lean operation.

If the degree of deterioration of the three-way catalyst 14a increases, the answer to step S33 may become affirmative (YES) during lean operation. Then, the process proceeds from step S33 to step S39, wherein the downstream oxygen concentration parameter KOSLEAN is set to "0". Thereafter, the process proceeds to step S40 to start rich operation. That is, in this case, the switching to rich operation is performed before the first inflowing oxygen amount OS exceeds the lean limit value OSOBJL. Further, the answer to step S35 may become affirmative (YES) during rich operation. Then, the process proceeds from step S35 to step S37, wherein the downstream oxygen concentration parameter KOSLEAN is set to "1". Thereafter, the process proceeds to step S38 to start lean operation. That is, in this case, the switching to lean operation is performed before the first inflowing oxygen amount OS becomes lower than the rich limit value OSOBJR.

The determination using the downstream oxygen concentration parameter KOSLEAN in addition to the O2 sensor output SVO2 is performed for preventing the control from hunting hysteresis.

According to steps S16, S17, S33, S35, S37, and S39 described above, if the O2 sensor output SVO2 is reversed, the correction amount PO2C can be reliably calculated. The exhaust characteristics of the engine are prevented from deteriorating even if the three-way catalyst 14a is deteriorated and the O2 sensor output SVO2 changes before the first inflowing oxygen amount OS exceeds the limit values OSOBJL or OSOBJR.

In step S41, a KTCATD table graphically shown in FIG. 12E is retrieved according to the catalyst temperature TCAT to calculate a third temperature correction coefficient KTCATD. The KTCATD table is set so that the third temperature correction coefficient KTCATD increases as the catalyst temperature TCAT rises in the same manner as the KTCATL table. Further, at the same catalyst temperature TCAT, the third temperature correction coefficient KTCATD is set to a value greater than the second temperature correction coefficient KTCATL.

In step S42, the third temperature correction coefficient and the reference oxygen amount OSC calculated in step S12 are applied to equation (10) to calculate an inhibition determination threshold value OSDISABLE.

$$OSDISABLE = OSC \times KTCATD \qquad (10)$$

In step S43, whether the absolute value of the first inflowing oxygen amount OS is greater than the inhibition determination threshold value OSDISABLE is determined. When the answer to step S43 is affirmative (YES), an inhibition flag FDISABLEOS is set to "1" in step S45. When |OS| is equal to or less than OSDISABLE, the inhibition flag FDISABLEOS is set to "0" in step S44. If the inhibition flag FDISABLEOS is set to "1", the deterioration determination of the catalyst is stopped (refer to FIG. 19, step S71).

For example, when the throttle valve opening rapidly changes and the air-fuel ratio control cannot quickly follow the change in the intake air amount, the absolute value of the first inflowing oxygen amount OS may become unusually large. In such case, the deterioration determination cannot be accurately performed. Therefore, the determination accuracy is prevented from being affected by inhibiting the deterioration determination.

FIG. 13 is a flowchart of the KCMD calculation process executed in step S6 of FIG. 6.

In step S51, whether the perturbation of the air-fuel ratio is being performed is determined. If the answer to step S51 is affirmative (YES), whether the air-fuel ratio switching parameter KOSFB set in the process of FIGS. 10 and 11 is equal to the preceding value KOSFBZ is determined in step S52.

If the answer to step S51 or step S52 is negative (NO) and the perturbation is not being performed, or if the value of the air-fuel ratio switching parameter KOSFB has changed, the basic value KCMDB of the target air-fuel ratio coefficient is set to "1.0" (step S53), and the process proceeds to step S54. If KOSFB is equal to KOSFBZ, the process immediately proceeds to step S54.

In step S54, whether the air-fuel ratio switching parameter KOSFB is equal to "1" is determined. If the answer to step S54 is affirmative (YES), the basic value KCMDB is updated by equation (11) in step S55.

$$KCMDB=KCMDB+\Delta KCMD \quad (11)$$

where $\Delta KCMD$ is a predetermined updating value, which is, for example, set to "0.0002".

If the air-fuel ratio switching parameter KOSFB is equal to "1", the basic value KCMDB gradually increases from "1.0" by repeatedly executing step S55. That is, the air-fuel ratio gradually changes in the rich direction.

If KOSFB is equal to "−1" in step S54, the basic value KCMDB is updated by equation (12) in step S56.

$$KCMDB=KCMDB-\Delta KCMD \quad (12)$$

If the air-fuel ratio switching parameter KOSFB is equal to "−1", the basic value KCMDB gradually decreases from "1.0" by repeatedly executing step S56. That is, the air-fuel ratio gradually changes in the lean direction.

In steps S57 to S60, a limit process of the calculated basic value KCMDB is performed. That is, if the basic value KCMDB is greater than an upper limit value KCMDH (for example, "1.03"), the basic value KCMDB is set to the upper limit value KCMDH (step S57, step S58). If the basic value KCMDB is less than a lower limit value KCMDL (for example, "0.97"), the basic value KCMDB is set to the lower limit value KCMDL (step S59, step S60).

In step S61, the target air-fuel ratio coefficient (target equivalent ratio) KCMD is calculated by adding the correction amount PO2C to the basic value KCMDB.

According to the process of FIG. 13, the basic value KCMDB changes, as graphically shown in FIG. 14B, according to the value of the air-fuel ratio switching parameter KOSFB graphically shown in FIG. 14A.

FIGS. 15 and 16 show a flowchart of the PO2C calculation process executed in step S7 of FIG. 6.

In step S101, whether the perturbation of the air-fuel ratio is being performed is determined. If the answer to step S101 is negative (NO), the process proceeds to step S102, wherein an initialization of the parameters used in this process is performed. That is, values of an intake air amount GAIRSUM, a second inflowing oxygen amount OSSVO2, a peak inflowing oxygen amount OSCSVO2, the correction amount PO2C, and the counter CDO2 are all set to "0". The intake air amount GAIRSUM is an accumulated value of the intake air flow rate GAIR calculated in step S117. The second inflowing oxygen amount OSSVO2 is an amount of oxygen flowing into the three-way catalyst 14a. The second inflowing oxygen amount OSSVO2 is also calculated in step S117.

In step S103, whether the O2 sensor output SVO2 is greater than a second rich predetermined value SVO2OBJH (which is set to a value slightly less than the first rich predetermined value SVO2RICH) is determined. The second rich predetermined value SVO2OBJH corresponds to an air-fuel ratio which is slightly richer than the stoichiometric ratio. If the answer to step S103 is affirmative (YES), a downstream concentration flag FSVO2LEAN is set to "1" (step S104), and the process proceeds to step S105. If SVO2 is equal to or less than SVO2OBJH in step S103, the process immediately proceeds to step S105.

In step S105, whether the O2 sensor output SVO2 is less than a second lean predetermined value SVO2OBJL (which is set to a value slightly greater than the first lean predetermined value SVO2LEAN) is determined. The second lean predetermined value SVO2OBJL corresponds to an air-fuel ratio which is slightly leaner than the stoichiometric ratio. If the answer to step S105 is affirmative (YES), the downstream concentration flag FSVO2LEAN is set to "0" (step S106) and, thereafter, the process ends. If SVO2 is equal to or greater than SVO2OBJL in step S105, the process immediately ends.

If the answer to step S101 is affirmative (YES), i.e., if the perturbation is being performed, whether the O2 sensor output SVO2 is greater than the second rich predetermined value SVO2OBJH, whether the inflowing oxygen flow rate O2 takes a positive value, and whether the downstream concentration flag FSVO2LEAN is equal to "0" are determined in step S107. That is, in step S107, whether the O2 sensor output SVO2 changes from the value indicative of a lean air-fuel ratio to the value indicative of a rich air-fuel ratio, and whether the inflowing oxygen flow rate O2 changes from a negative to a positive value (the corrected equivalent ratio KACTM becomes less than "1.0") are determined. During perturbation control, the inflowing oxygen flow rate O2 changes to a positive value after the O2 sensor output SVO2 changes from a value indicative of a lean air-fuel ratio to a value indicative of a rich air-fuel ratio and lean operation is started.

If the answer to step S107 is negative (NO), whether the O2 sensor output SVO2 is less than the second lean predetermined value SVO2OBJL, whether the inflowing oxygen flow rate O2 takes a negative value, and whether the downstream concentration flag FSVO2LEAN is equal to "1" are determined in step S109. That is, in step S109, whether the O2 sensor output SVO2 changes from the value indicative of a rich air-fuel ratio to the value indicative of a lean air-fuel ratio, and whether the inflowing oxygen flow rate O2 changes from a positive value to a negative value (the corrected equivalent ratio KACTM exceeds "1.0") are determined. During perturbation control, the inflowing oxygen flow rate O2 changes to a negative value after the value O2 sensor output SVO2 changes from a value indicative of a rich air-fuel ratio to a value indicative of a lean air-fuel ratio and rich operation is started.

If the answer to step S109 is negative (NO), the process proceeds to step S117, wherein the second inflowing oxygen amount OSSVO2 and the intake air amount GAIRSUM are calculated by equations (13) and (14).

$$OSSVO2=OSSVO2+O2 \quad (13)$$

$$GAIRSUM=GAIRSUM+GAIR \quad (14)$$

In step S118, whether the downstream concentration flag FSVO2LEAN is equal to "1" is determined. If the answer to step S118 is affirmative (YES), i.e., if the O2 sensor output SVO2 indicates the rich air-fuel ratio and the inflowing oxygen flow rate O2 takes a positive value, the second inflowing oxygen amount OSSVO2 and the peak inflowing oxygen amount OSCSVO2 are calculated by equations (15) and (16) in step S120.

$$OSSVO2=\max(OSSVO2, 0) \quad (15)$$

$$OSCSVO2=\max(OSCSVO2, OSSVO2) \quad (16)$$

When the second inflowing oxygen amount OSSVO2 takes a negative value, the second inflowing oxygen amount OSSVO2 is reset to "0" by equation (15). Further, the peak inflowing oxygen amount OSCSVO2 is calculated as a maximum value of the second inflowing oxygen amount OSSVO2 by equation (16).

If FSVO2LEAN is equal to "0" in step S118, i.e., the O2 sensor output SVO2 indicates the lean air-fuel ratio and the inflowing oxygen flow rate O2 take negative values, the second inflowing oxygen amount OSSVO2 and the peak inflowing oxygen amount OSCSVO2 are calculated by equations (17) and (18) in step S119.

$$OSSVO2=\min(OSSVO2, 0) \quad (17)$$

$$OSCSVO2=\min(OSCSVO2, OSSVO2) \quad (18)$$

When the second inflowing oxygen amount OSSVO2 takes a positive value, the second inflowing oxygen amount OSSVO2 is reset to "0" by equation (17). Further, the peak inflowing oxygen amount OSCSVO2 is calculated as a minimum value of the second inflowing oxygen amount OSSVO2 by equation (18).

If the answer to step S107 is affirmative (YES), the process proceeds to step S108, wherein the downstream concentration flag FSVO2LEAN is set to "1", a rich inflowing oxygen amount OSCR is set to the present value of the peak inflowing oxygen amount OSCSVO2, and a rich intake air amount GAIRSUMR is set to the present value of the intake air amount GAIRSUM.

In step S112, the second inflowing oxygen amount OSSVO2 is reset by equation (19), the peak inflowing oxygen amount OSCSVO2 and the intake air amount GAIRSUM are reset to "0", and the counter CDO2 is incremented by "1". By equation (19), the second inflowing oxygen amount OSSVO2 is normally reset to "0". However, the second inflowing oxygen amount OSSVO2 may not be set to "0" when the response delay of the O2 sensor 18 becomes large.

$$OSSVO2=OSSVO2-OSCSVO2 \quad (19)$$

In step S113, whether the value of the counter CDO2 is equal to or greater than "2" is determined. Since the answer to step S113 is initially negative (NO), the process immediately proceeds to step S117.

If lean operation is thereafter performed and the answer to step S109 becomes affirmative (YES), the process proceeds to step S111, wherein the downstream concentration flag FSVO2LEAN is set to "0", a lean inflowing oxygen amount OSCL is set to the present value of the peak inflowing oxygen amount OSCSVO2, and a lean intake air amount GAIRSUML is set to the present value of the intake air amount GAIRSUM. Thereafter, the process proceeds to step S113 through step S112. At this time, the answer to step S113 becomes affirmative (YES), and the process proceeds to step S114, wherein the rich inflowing oxygen amount OSCR, the lean inflowing oxygen amount OSCL, the rich intake air amount GAIRSUMR, and the lean intake air amount GAIRSUML are applied to equation (20) to calculate an oxygen concentration deviation amount DO2. The oxygen concentration deviation amount DO2 indicates an amount of deviation between the oxygen concentration O2SVO2 detected by the O2 sensor output SVO2 and the oxygen concentration O2LAF detected by the LAF sensor 17.

$$DO2=(OSCR+OSCL)/(GAIRSUMR+GAIRSUML) \quad (20)$$

When the oxygen concentration O2LAF coincides with the oxygen concentration O2SVO2, a sum of the rich inflowing oxygen amount OSCR and the lean inflowing oxygen amount OSCL becomes equal to "0". Therefore, the oxygen concentration deviation amount DO2 becomes equal to "0". Further, when the oxygen concentration O2LAF is lower than the oxygen concentration O2SVO2, the oxygen concentration deviation amount DO2 takes a negative value. In contrast, when the oxygen concentration O2LAF is higher than the oxygen concentration O2SVO2, the oxygen concentration deviation amount DO2 takes a positive value.

Figure 17:
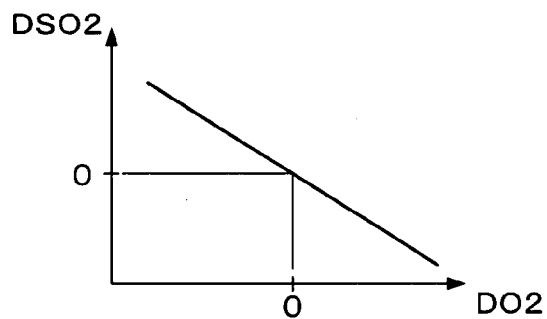
FIG. 17 is a graphical representation of a table referred to in the process of FIG. 15.

In step S115, a DSO2 table graphically shown in FIG. 17 is retrieved according to the oxygen concentration deviation amount DO2 to calculate an equivalent ratio converted value DSO2 of the oxygen concentration deviation amount DO2. In step S116, the equivalent ratio converted value DSO2 is accumulated by equation (21) to calculate the correction amount PO2C. Thereafter, the process proceeds to step S117.

$$PO2C=PO2C+DSO2 \quad (21)$$

By the conversion in step S115, the plus/minus sign of the equivalent ratio converted value DSO2 becomes contrary to the plus/minus sign of the oxygen concentration deviation amount DO2. The correction amount PO2C takes a positive value when the detected equivalent ratio KACT deviates in the rich direction and takes a negative value when the detected equivalent ratio KACT deviates in the lean direction.

Figure 18:
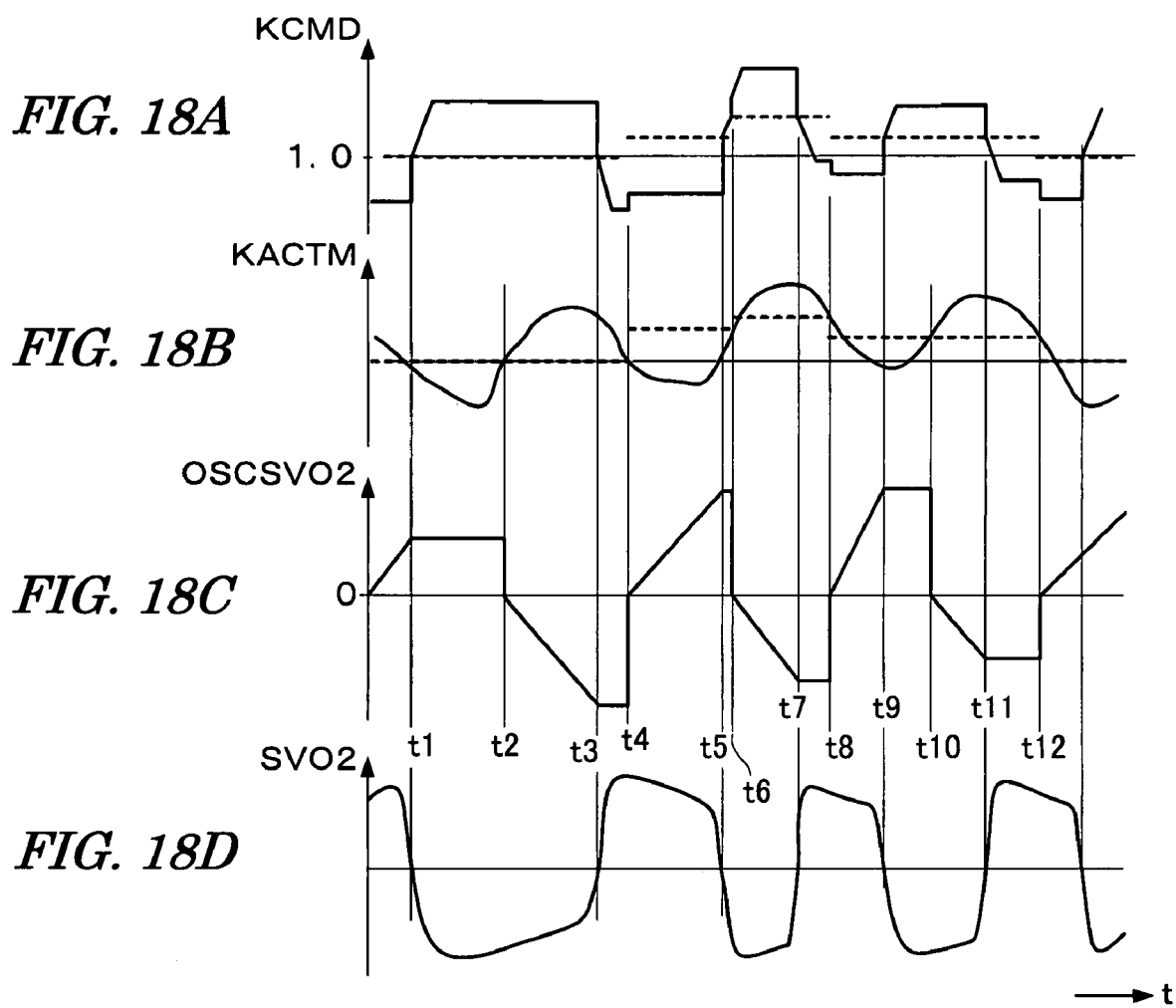
FIGS. 18A-18D are graphical representations of the time charts for illustrating the process of FIG. 15 and FIG. 16.

FIGS. 18A-18D show time charts for illustrating the process of FIGS. 15 and 16. Before time t4, the absolute values of the limit values OSOBJL and OSOBJR of perturbation control are changed to greater values by steps S16 and S17 of FIG. 10, and the continuation time periods of rich operation and lean operation become long. Consequently, the O2 sensor output SVO2 turns over (FIG. 18D, times t1 and t3). At time t4, the correction amount PO2C is first calculated and the center value of the detected equivalent ratio KACT is corrected in the decreasing direction by the correction amount PO2C (FIG. 18B). In FIG. 18B, the correction of the detected equivalent ratio KACT in the decreasing direction is equivalently shown by making the "1.0" level of the equivalent ratio (shown by the dashed line in FIG. 18B) increase by the correction amount PO2C. Further, at time t4, the target air-fuel ratio coefficient KCMD increases by the correction amount PO2C (FIG. 18A). Thereafter, at times t6, t8, t10, t12, . . . the oxygen concentration deviation amount DO2 is calculated, and the correction amount PO2C is updated.

The second inflowing oxygen amount OSSVO2 gradually decreases as shown in FIG. 18C when the corrected equivalent ratio KACTM takes a value greater than "1.0". When the O2 sensor output SVO2 changes to a value indicative of the rich air-fuel ratio, lean operation is started (t3, t7, t11). Thereafter, the second inflowing oxygen amount OSSVO2 is detected as the rich inflowing oxygen amount OSCR at the time the corrected equivalent ratio KACTM reaches "1.0" (t4, t8, t12). Further, the second inflowing oxygen amount OSSVO2 gradually increases when the corrected equivalent ratio KACTM takes a value less than "1.0". When the O2 sensor output SVO2 changes to a value indicative of the lean air-fuel ratio, rich operation is started (t1, t5, t9). Thereafter, the second inflowing oxygen amount OSSVO2 is detected as the lean inflowing oxygen amount OSCL at the time the corrected equivalent ratio KACTM reaches "1.0" (t2, t6, t10).

It is to be noted that FIGS. 18A-18D show an example which the three-way catalyst 14a has deteriorated and the turn-over of the O2 sensor output SVO2 continually occurs after time t3.

According to the process of FIGS. 15 and 16, the rich inflowing oxygen amount OSCR and the lean inflowing oxygen amount OSCL are calculated. The rich inflowing oxygen amount OSCR indicates an amount of oxygen flowing out from the three-way catalyst 14a during the time period from the time when the detected equivalent ratio KACT (or the corrected equivalent ratio KACTM) changes to a value indicative of the rich air-fuel ratio (t2, t6, t10) to the time when the O2 sensor output SVO2 changes to a value indicative of the rich air-fuel ratio (t3, t7, t11). The lean inflowing oxygen amount OSCL indicates the amount of oxygen which flowed into the three-way catalyst 14a during the time period from the time when the detected equivalent ratio KACT (or the corrected equivalent ratio KACTM) changed to a value indicative of the lean air-fuel ratio to (t4, t8) to the time when the O2 sensor output SVO2 changed to a value indicative of the lean air-fuel ratio (t5, t9). Further, the oxygen concentration deviation amount DO2 is calculated using the rich inflowing oxygen amount OSCR, the lean inflowing oxygen amount OSCL, and the corresponding intake air amounts GAIRSUMR and GAIRSUML. The correction amount PO2C is calculated from the oxygen concentration deviation amount DO2. Since the correction amount PO2C is obtained when the O2 sensor output SVO2 turns over at least twice, a deviation of the detected value which occurs in a short time period, such as a deviation caused by a change in the engine operating condition, can be corrected quickly to obtain an accurate value of the corrected equivalent ratio KACTM. Consequently, accurate air-fuel ratio switching control can be performed to appropriately control the oxygen concentration in exhaust gases flowing into the three-way catalyst 14a, thereby maintaining good exhaust characteristics.

FIGS. 19 and 20 show a flowchart of the deterioration determination process executed in step S8 of FIG. 6.

In step S71, whether the inhibition flag FDISABLEOS is equal to "1" is determined. If the answer to step S71 is negative (NO), whether perturbation control of the air-fuel ratio is being performed is determined in step S72. If the answer to step S71 is affirmative (YES) or the answer to step S72 is negative (NO), a maximum value SVO2 MAX of the O2 sensor output SVO2 is set to "0", a minimum value SVO2 MIN of the O2 sensor output SVO2 is set to "1500" (step S73), and the process immediately ends.

If the answer to step S72 is affirmative (YES), i.e., when perturbation control of the air-fuel ratio is being performed, whether the air-fuel ratio switching parameter KOSFB is equal to the preceding value KOSFBZ is determined in step S74. If KOSFB is equal to KOSFBZ, the maximum value SVO2 MAX and the minimum value SVO2 MIN are updated by equations (22) and (23). The operation on the right side of equation (22) is for selecting the greater one of the preceding maximum value SVO2 MAX and the present O2 sensor output SVO2. The operation on the right side of equation (23) is for selecting the smaller one of the preceding minimum value SVO2 MIN and the present O2 sensor output SVO2. After executing step S75, the process proceeds to step S89.

$$SVO2MAX = \max(SVO2MAX, SVO2) \quad (22)$$

$$SVO2MIN = \min(SVO2MIN, SVO2) \quad (23)$$

If the answer to step S74 is negative (NO), i.e., immediately after the air-fuel ratio switching parameter KOSFB has been changed, a second stored value SVO2 LP2 of the maximum value SVO2 MAX or the minimum value SVO2 MIN is set to a first stored value SVO2 LP1 in step S76. The first stored value SVO2 LP1 is set to the maximum value SVO2 MAX or the minimum value SVO2 MIN in step S78 or step S80 immediately after the preceding air-fuel ratio switching.

In step S77, whether the air-fuel ratio switching parameter KOSFB is equal to "1" is determined. If the answer to step S77 is affirmative (YES), the first stored value SVO2 LP1 is set to the present maximum value SVO2 MAX, and the maximum value SVO2 MAX is reset to "0" in step S78. If the air-fuel ratio switching parameter KOSFB is equal to "−1", the answer to step S77 becomes negative (NO), and the process immediately proceeds to step S79.

In step S79, whether the air-fuel ratio switching parameter KOSFB is equal to "−1" is determined. If the air-fuel ratio switching parameter KOSFB is equal to "−1", the process proceeds to step S80, wherein the first stored value SVO2 LP1 is set to the present minimum value SVO2 MIN, and the minimum value SVO2 MIN is reset to "1500". If the air-fuel ratio switching parameter KOSFB is equal to "1", the answer to step S79 becomes negative (NO), and the process immediately proceeds to step S81.

In step S81, a third difference parameter SVO2 D3 indicative of a difference between the maximum value SVO2 MAX and the minimum value SVO2 MIN is set to a second difference parameter SVO2 D2, and the second difference parameter SVO2 D2 is set to a first difference parameter SVO2 D1. Thereafter, the first difference parameter SVO2 D1 is updated in steps S82 to S87.

In step S82, whether the second stored value SVO2 LP2 is greater than a predetermined value SVO2 OBJ corresponding to the stoichiometric ratio, and whether the first stored value SVO2 LP1 is less than the predetermined value SVO2 OBJ are determined. If the answer to step S82 is negative (NO), whether the second stored value SVO2 LP2 is less than the predetermined value SVO2 OBJ, and whether the first stored value SVO2 LP1 is greater than the predetermined value SVO2 OBJ are determined in step S84. If both of the answers to steps S82 and S84 are negative (NO), i.e., both the first and second stored values SVO2 LP1 and SVO2 LP2 are less than the predetermined value SVO2 OBJ, or when both the first and second stored values SVO2 LP1 and SVO2 LP2 are greater than the predetermined value SVO2 OBJ, it is indicated that the O2 sensor output SVO2 minimally changes. That is, it stays at a substantially constant level. Accordingly, the first difference parameter SVO2 D1 is set to "0" (step S87), and the process proceeds to step S88.

If the answer to step S82 or step S84 is affirmative (YES), i.e., the maximum value SVO2 MAX is greater than the predetermined value SVO2 OBJ and the minimum value SVO2 MIN is less than the predetermined value SVO2 OBJ at consecutive timings of the air-fuel ratio switching, the first stored value SVO2 LP1 and the second stored value SVO2 LP2 are applied to equation (24) to calculate the first difference parameter SVO2 D1 in step S86. Thereafter, the process proceeds to step S88.

$$SVO2D1 = |SVO2LP1 - SVO2LP2| \quad (24)$$

In step S88, a minimum difference value SVO2 D is calculated as a minimum value of the first-to-third difference parameters SVO2 D1, SVO2 D2, and SVO2 D3 by equation (25). Further, the minimum difference value SVO2 D is accumulated to calculate a determination parameter RESULT by equation (26), and a counter CRESULT is incremented by "1". The determination parameter RESULT indicates the deterioration degree of the three-way catalyst 14a.

$$SVO2D = \min(SVO2D1, SVO2D2, SVO2D3) \quad (25)$$

$$RESULT = RESULT + SVO2D \quad (26)$$

Unless the difference parameter SVO2 D1 takes a large value for three consecutive times or more, the minimum difference value SVO2 D takes a relatively small value. Therefore, by using the minimum difference value SVO2 D, which is the minimum value among the difference parameters SVO2 D1, SVO2 D2, and SVO2 D3 obtained at three consecutive sampling timings, influence of a temporary change in the O2 sensor output SVO2 can be eliminated. Accordingly, an accurate value of the determination parameter RESULT can be obtained.

In step S89, whether the value of the counter CRESULT is greater than a predetermined number CRST0 (for example, "6") is determined. If the answer to step S89 is negative (NO), the process immediately ends. If the value of the counter CRESULT exceeds the predetermined number CRST0 in step S89, the process proceeds to step S90, wherein whether the determination parameter RESULT is greater than the deterioration determination threshold value RSTTH is determined. If the answer to step S90 is negative (NO), the three-way catalyst 14a is determined to be normal in step S92. If the determination parameter RESULT exceeds the deterioration determination threshold value RSTTH, the three-way catalyst 14a is determined to be abnormal, i.e., deteriorated beyond an acceptable amount in step S91 and a warning lamp can be turned on.

The determination parameter RESULT takes a value substantially equal to zero when the O2 sensor output SVO2 changes as shown in FIG. 2A, i.e., when the three-way catalyst 14a is normal. In contrast, the determination parameter RESULT takes a large value when the O2 sensor output SVO2 changes as shown in FIG. 2B, i.e., when the three-way catalyst 14a is deteriorated. Accordingly, the deterioration degree of the three-way catalyst 14a can be accurately detected by using the determination parameter RESULT.

Figure 21A:
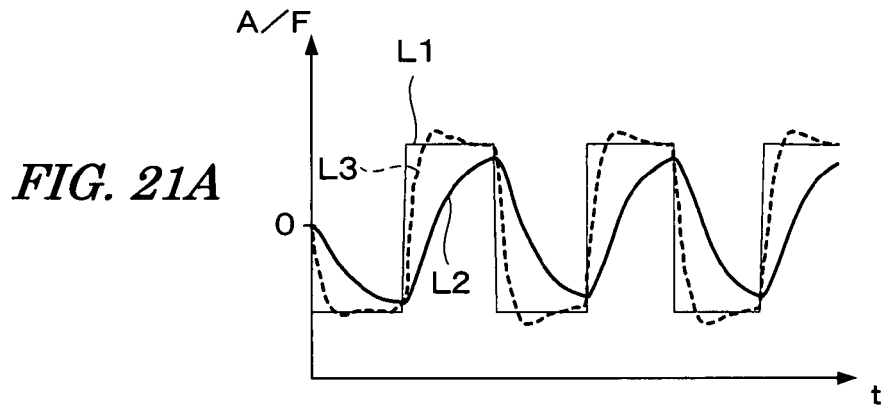
FIGS. 21A-21D are graphical representations of the time charts for illustrating problems of the conventional technique and the effects of the present invention.
Figure 21B:
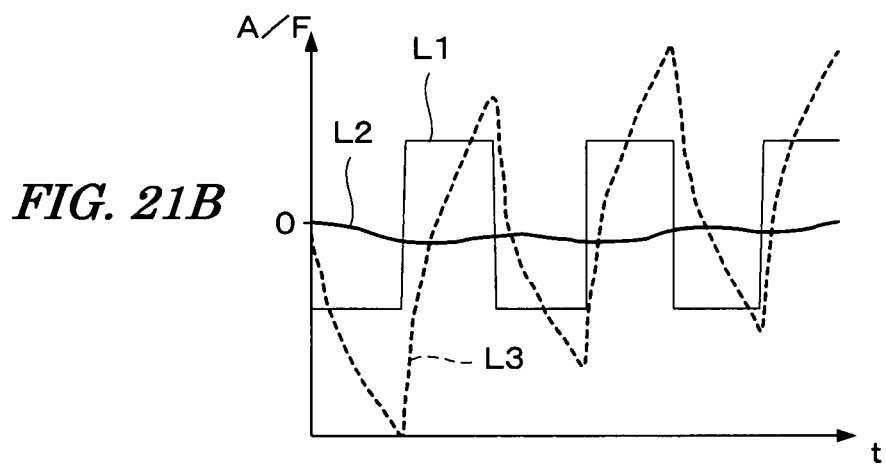
Figure 21C:
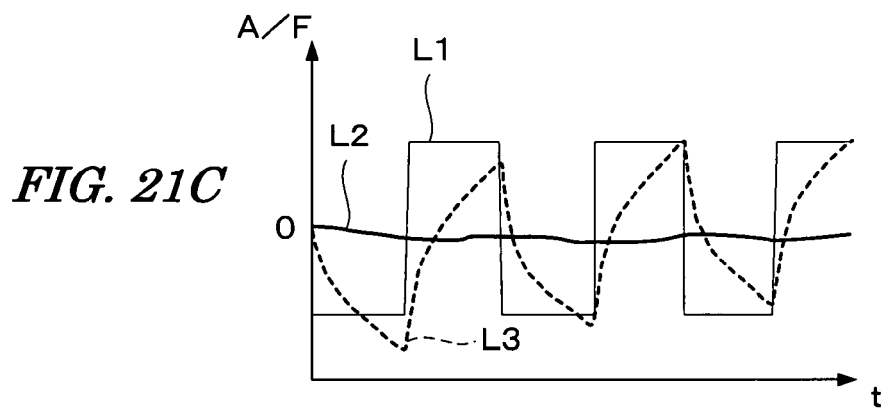
Figure 21D:
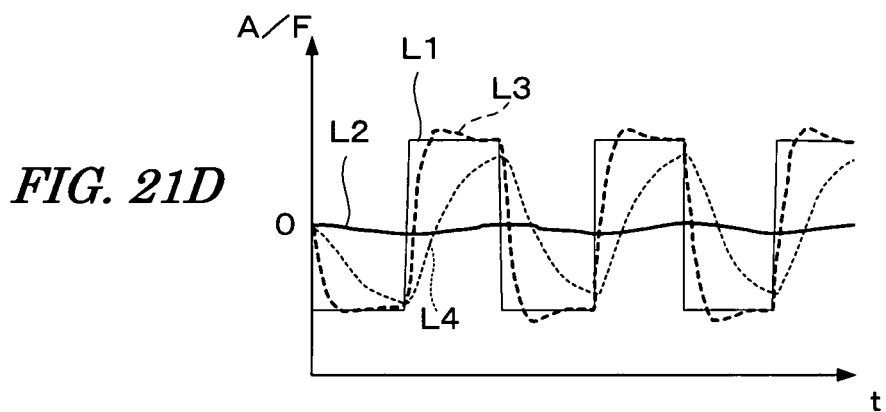

As described above, in this embodiment, the first-order delay time constant T indicative of the degree of response deterioration of the LAF sensor 17 is calculated, and the frequency characteristic of the response deterioration compensating calculation is adjusted according to the calculated first-order delay time constant T. Consequently, the air-fuel ratio detecting characteristic of the sensor which is deteriorated in the response characteristic as shown by the thin dashed line L4 of FIG. 21D can be made substantially similar to the detecting characteristic obtained when the sensor is not deteriorated (FIG. 21A, the solid line L2). Therefore, as shown by the thick solid line L3 of FIG. 21D, the air-fuel ratio control signal SCTL similar to the signal obtained when the sensor is not deteriorated can be obtained, thereby maintaining good air-fuel ratio control performance.

Further, in this embodiment, the amount OS of oxygen flowing into the three-way catalyst 14a is calculated according to the oxygen concentration parameter O2N calculated according to the LAF sensor 17 output and the intake air flow rate GAIR detected by the intake air flow rate sensor 7. Further, perturbation control of the air-fuel ratio is performed. In perturbation control, the air-fuel ratio is controlled to alternately change between lean and rich with respect to the stoichiometric ratio according to a comparison result obtained by comparing the first inflowing oxygen amount OS with the rich limit value OSOBJR or the lean limit value OSOBJL. Further, the determination parameter RESULT indicative of the deterioration degree of the three-way catalyst 14a is calculated based on the O2 sensor output SVO2 during execution of perturbation control. The rich limit value OSOBJR and the lean limit value OSOBJL, which are target values of the first inflowing oxygen amount OS, are set so that the O2 sensor output SVO2 minimally changes when the three-way catalyst is normal and greatly changes when the three-way catalyst is deteriorated. Therefore, the deterioration degree can be detected quickly with minimal degradation of the exhaust characteristics of the engine when the catalyst begins to deteriorate and without degrading the exhaust characteristics at all when the catalyst is normal.

Furthermore, since the oxygen concentration parameter O2N is calculated using the compensated sensor output VLAFC when the LAF sensor 17 is deteriorated in response characteristic, the inflowing oxygen amount of the three-way catalyst is appropriately controlled to prevent the exhaust characteristics from deteriorating even when the LAF sensor 17 is deteriorated in its response characteristic.

Further, the LAF sensor output VLAF is used as-is when the first-order delay time constant T indicative of the response deterioration degree of the LAF sensor 17 is equal to or less than the predetermined time period TDTH, while the compensated sensor output VLAFC is used when the first-order delay time constant T exceeds the predetermined time period TDTH. Accordingly, the air-fuel ratio control can always be performed accurately and the catalyst deterioration detection can be performed without degrading the exhaust characteristics irrespective of whether the response characteristic of the LAF sensor 17 is deteriorated or not.

Further, when the oxygen concentration detected by the LAF sensor 17 and the oxygen concentration detected by the O2 sensor 18 deviate from each other, the O2 sensor output SVO2 does not change as shown in FIG. 2B even if the three-way catalyst 14a has deteriorated. Accordingly, an improper determination may be made that the three-way catalyst 14a is normal although the three-way catalyst 14a is actually deteriorated. In this embodiment, since the oxygen concentration deviation is corrected with the correction amount PO2C, accurate determination can be performed irrespective of changes in the operating condition of the engine 1.

Further, the basic value KCMDB of the target air-fuel ratio coefficient is corrected with the correction amount PO2C to calculate the target air-fuel ratio coefficient KCMD. Accordingly, the air-fuel ratio in rich operation and the air-fuel ratio in lean operation become an air-fuel ratio corresponding to the oxygen concentration detected by the LAF sensor 17, thereby keeping the amount of oxygen flowing into the three-way catalyst 14a and the amount of oxygen flowing out from the three-way catalyst 14a at a substantially same level and maintaining a good oxygen accumulating condition of the three-way catalyst 14a.

In this embodiment, the intake air flow rate sensor 7, the LAF sensor 17, and the O2 sensor 18 respectively correspond to the intake air flow rate detecting means, the first oxygen concentration sensor, and the second oxygen concentration sensor. Further, the ECU 5 constitutes the compensating means, the sensor deterioration detecting means, the adjusting means, the control means, the inflowing oxygen amount calculating means, the air-fuel ratio switching control means, the catalyst deterioration detecting means, and the switching means. Specifically, step S2 of FIG. 6 corresponds to the compensating means; the process of FIG. 7 corresponds to the sensor deterioration detecting means; the calculation of the first-order delay compensated output VLAFC1 by equation (2) including the first-order delay time constant T corresponds to the adjusting means; the KAF calculation block 35 of FIG. 3 and the calculation of the fuel injection period TOUT by equation (1) correspond to the control means; and step S2 of FIG. 6 corresponds to the switching means. Further, step S11 of FIG. 10 and step S117 of FIG. 16 correspond to the inflowing oxygen amount calculating means; steps S12 to S17, S19 to S29 of FIG. 10, steps S31 to S40 of FIG. 11, and the process of FIG. 13 correspond to the air-fuel ratio switching control means; and steps S72 to S81 of FIG. 19 and steps S82 to S92 of FIG. 20 correspond to the catalyst deterioration detecting means.

The present invention is not limited to the embodiment described above, and various modifications may be made. For example, in the embodiment described above, the three-way catalysts 14a and 14b are contained in one container. Alternatively, the two catalysts may be contained in two separate containers. Further, even if the three-way catalyst is not provided downstream of the O2 sensor 18, the present invention is applicable. Even in such case, the present invention can reduce degradation of the exhaust characteristics when performing the deterioration determination of the catalyst as compared with the conventional technique.

Further, in the embodiment described above, when performing the deterioration determination of the three-way catalyst 14a, perturbation control of the air-fuel ratio is performed. Perturbation control may always be performed for maintaining the inflowing oxygen amount of the three-way catalyst 14a at the optimum level as shown in JP-'651. In this case, it is desirable to calculate the correction amount PO2C by reversing the O2 sensor output SVO2 at least twice with an appropriate time interval TCR and correct the detected equivalent ratio KACT with the calculated correction amount PO2C. It is further desirable that the time interval TCR is set to a smaller value as the intake air amount GAIR increases.

Further, when the normal air-fuel ratio feedback control is performed according to the LAF sensor output VLAF without performing the above-described perturbation control, the compensated sensor output VLAFC may be calculated and the normal air-fuel ratio feedback control may be performed according to the compensated sensor output VLAFC when the deterioration degree of the oxygen concentration sensor increases.

The present invention can be applied also to the air-fuel ratio control system for a watercraft propulsion engine, such as an outboard engine having a vertically extending crankshaft.

The present invention may be embodied in other specific forms without departing from the spirit or essential characteristics thereof. The above-disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An air-fuel ratio control system for an internal combustion engine having a catalyst provided in an exhaust system of said engine for purifying exhaust gases, said air-fuel ratio control system controlling an air-fuel ratio of an air-fuel mixture supplied to said engine and comprising:
   a first oxygen concentration sensor disposed upstream of said catalyst;
   compensating means for compensating a response delay of said first oxygen concentration sensor to calculate a compensated sensor output;
   sensor deterioration detecting means for detecting a degree of response deterioration of said first oxygen concentration sensor;
   adjusting means for adjusting a frequency characteristic of said compensating means according to the degree of deterioration detected by said sensor deterioration detecting means; and
   control means for controlling the air-fuel ratio so that a detected air-fuel ratio calculated from the compensated sensor output coincides with a target air-fuel ratio.

2. An air-fuel ratio control system according to claim 1, further comprising:
   intake air flow rate detecting means for detecting an intake air flow rate of said engine;
   a second oxygen concentration sensor disposed downstream of said catalyst;
   inflowing oxygen amount calculating means for calculating an inflowing oxygen amount which is an amount of oxygen flowing into the catalyst according to the oxygen concentration calculated from the compensated sensor output and the intake air flow rate detected by said intake air flow rate detecting means;
   air-fuel ratio switching control means for controlling the air-fuel ratio of the air-fuel mixture supplied to said engine, alternately to a lean air-fuel ratio which is leaner than the stoichiometric ratio and a rich air-fuel ratio which is richer than the stoichiometric ratio, according to a comparison result obtained by comparing the inflowing oxygen amount with target values of the inflowing oxygen amount; and
   catalyst deterioration detecting means for detecting a deterioration degree of said catalyst based on an output of said second oxygen concentration sensor during the operation of said air-fuel ratio switching control means.

3. An air-fuel ratio control system according to claim 2, further comprising switching means for switching an output of said first oxygen concentration sensor and the compensated sensor output according to the degree of deterioration detected by said sensor deterioration detecting means,
   wherein said control means and said inflowing oxygen amount calculating means respectively calculate the detected air-fuel ratio and the oxygen concentration according to an output of said switching means.

4. An air-fuel ratio control method for an internal combustion engine having a catalyst provided in an exhaust system of said engine for purifying exhaust gases and a first oxygen concentration sensor disposed upstream of said catalyst, said air-fuel ratio control method controlling an air-fuel ratio of an air-fuel mixture supplied to said engine and comprising the steps of:
   a) detecting a degree of response deterioration of said first oxygen concentration sensor;
   b) compensating a response delay of said first oxygen concentration sensor according to the degree of deterioration detected in said step a) to calculate a compensated sensor output; and
   c) controlling the air-fuel ratio so that a detected air-fuel ratio calculated from the compensated sensor output coincides with a target air-fuel ratio,
   wherein a frequency characteristic of the compensation performed in said step b) is adjusted according to the degree of deterioration detected in said step a).

5. An air-fuel ratio control method according to claim 4, wherein said engine has a second oxygen concentration sensor disposed downstream of said catalyst, and said air-fuel control method further comprises the steps of:
   d) detecting an intake air flow rate of said engine;
   e) calculating an inflowing oxygen amount which is an amount of oxygen flowing into the catalyst according to the oxygen concentration calculated from the compensated sensor output and the detected intake air flow rate;
   f) controlling the air-fuel ratio of the air-fuel mixture supplied to said engine, alternately to a lean air-fuel ratio which is leaner than the stoichiometric ratio and a rich air-fuel ratio which is richer than the stoichiometric ratio, according to a comparison result obtained by comparing the inflowing oxygen amount with target values of the inflowing oxygen amount; and
   g) detecting a deterioration degree of said catalyst based on an output of said second oxygen concentration sensor during the air-fuel ratio switching.

6. An air-fuel ratio control method according to claim 5, further comprising the step of switching an output of said first oxygen concentration sensor and the compensated sensor output according to the degree of deterioration detected in said step a), wherein the detected air-fuel ratio and the oxygen concentration are respectively calculated according to the switched output.

7. A computer program embodied on a computer-readable medium for causing a computer to implement an air-fuel ratio control method for an internal combustion engine having a catalyst provided in an exhaust system of said engine for purifying exhaust gases and a first oxygen concentration sensor disposed upstream of said catalyst, said air-fuel ratio control method controlling an air-fuel ratio of an air-fuel mixture supplied to said engine and comprising the steps of:

a) detecting a degree of response deterioration of said first oxygen concentration sensor;

b) compensating a response delay of said first oxygen concentration sensor according to the degree of deterioration detected in said step a) to calculate a compensated sensor output; and c) controlling the air-fuel ratio so that a detected air-fuel ratio calculated from the compensated sensor output coincides with a target air-fuel ratio, wherein a frequency characteristic of the compensation performed in said step b) is adjusted according to the degree of deterioration detected in said step a).

8. A computer program according to claim 7, wherein said engine has a second oxygen concentration sensor disposed downstream of said catalyst, and said air-fuel control method further comprises the steps of:

d) detecting an intake air flow rate of said engine;

e) calculating an inflowing oxygen amount which is an amount of oxygen flowing into the catalyst according to the oxygen concentration calculated from the compensated sensor output and the detected intake air flow rate;

f) controlling the air-fuel ratio of the air-fuel mixture supplied to said engine, alternately to a lean air-fuel ratio which is leaner than the stoichiometric ratio and a rich air-fuel ratio which is richer than the stoichiometric ratio, according to a comparison result obtained by comparing the inflowing oxygen amount with target values of the inflowing oxygen amount; and g) detecting a deterioration degree of said catalyst based on an output of said second oxygen concentration sensor during the air-fuel ratio switching.

9. A computer program according to claim 8, wherein said air-fuel ratio control method further comprises the step of switching an output of said first oxygen concentration sensor and the compensated sensor output according to the degree of deterioration detected in said step a), wherein the detected air-fuel ratio and the oxygen concentration are respectively calculated according to the switched output.

* * * * *